United States Patent
Yokoyama et al.

(10) Patent No.: US 11,115,849 B2
(45) Date of Patent: Sep. 7, 2021

(54) FIRST UNIT, SECOND UNIT AND METHOD

(71) Applicant: NEC CORPORATION, Tokyo (JP)

(72) Inventors: Toshihiro Yokoyama, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/270,161

(22) Filed: Feb. 7, 2019

(65) Prior Publication Data
US 2019/0174342 A1    Jun. 6, 2019

(30) Foreign Application Priority Data

Feb. 13, 2018    (JP) .............................. JP2018-023331

(51) Int. Cl.
| | | |
|---|---|---|
| *H04W 24/10* | (2009.01) | |
| *H04L 12/26* | (2006.01) | |
| *H04W 88/10* | (2009.01) | |
| *H04W 88/12* | (2009.01) | |
| *H04W 76/15* | (2018.01) | |
| *H04W 80/08* | (2009.01) | |

(Continued)

(52) U.S. Cl.
CPC ......... *H04W 24/10* (2013.01); *H04L 43/0876* (2013.01); *H04L 43/0894* (2013.01); *H04W 76/15* (2018.02); *H04W 88/10* (2013.01); *H04W 88/12* (2013.01); *H04W 80/08* (2013.01); *H04W 88/085* (2013.01); *H04W 92/20* (2013.01)

(58) Field of Classification Search
None
See application file for complete search history.

(56) References Cited

U.S. PATENT DOCUMENTS

| | | | | |
|---|---|---|---|---|
| 10,721,653 B2* | 7/2020 | Futaki | ................... | H04W 76/27 |
| 10,772,008 B2* | 9/2020 | Park | ................... | H04L 41/0816 |
| 10,798,732 B2* | 10/2020 | Park | ................... | H04W 72/087 |

(Continued)

FOREIGN PATENT DOCUMENTS

WO    2015/008552 A1    1/2015

OTHER PUBLICATIONS

Huawei, "Stage 3 for secondary RAT data volume reporting over X2", 3GPP TSG RAN WG3 Meeting #98, Nov. 27-Dec. 1, 2017. R3-174931, pp. 1-6 (total 7 pages).

(Continued)

*Primary Examiner* — Xavier S Wong

(57) ABSTRACT

In order to make it possible to report an amount of data from a secondary node (SN) to a master node (MN) in dual connectivity, there is provided a first unit according to the present disclosure which is a first unit of a central unit of a first base station. The first unit includes a controller and a transceiver. The central unit is configured to host at least PDCP layer in the first base station; and is connected to a distributed unit via a first interface, the distributed unit hosting RLC, MAC and PHY layers in the first base station. The controller is configured to host at least a user plane of the PDCP layer hosted by the central unit; and the transceiver is configured to transmit, to a second unit via a second interface, first information indicative of a volume of data processed by the first unit. The second unit is configured to host at least a control plane of the PDCP layer hosted by the central unit.

16 Claims, 35 Drawing Sheets

(51) Int. Cl.
*H04W 92/20* (2009.01)
*H04W 88/08* (2009.01)

(56) References Cited

U.S. PATENT DOCUMENTS

| | | | |
|---|---|---|---|
| 2015/0312904 A1 | 10/2015 | Ma et al. | |
| 2016/0165459 A1 | 6/2016 | Takayanagi et al. | |
| 2017/0006484 A1* | 1/2017 | Lee | H04W 76/10 |
| 2018/0083688 A1* | 3/2018 | Agiwal | H04M 3/537 |
| 2018/0227960 A1* | 8/2018 | Belghoul | H04W 36/0022 |
| 2018/0332659 A1* | 11/2018 | Hwang | H04W 76/10 |
| 2019/0208478 A1* | 7/2019 | Park | H04W 76/27 |

OTHER PUBLICATIONS

NTT Docomo, Inc., "Clarification on desired buffer size", 3GPP TSG-RAN WG3 #98, Nov. 27-Dec. 1, 2017, R3-174903, total 9 pages.

International Search Report for PCT/JP2019/003344 dated Apr. 23, 2019.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.0.0, Dec. 2017, 51 pages.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.0.0, Dec. 2017, 350 pages.

3rd Generation Partnership Project; Technical Specification Group Radio Access Network; Study of separation of NR Control Plane (CP) and User Plane (UP) for split option 2; (Release 15), 3GPP TS 38.806 V15.0.0, Dec. 2017, 22 pages.

Extended European Search Report for EP Application No. 19754416.6 dated Mar. 9, 2021.

Huawei: "Open issues for CP-UP separation", 3GPP Draft; R3-173122, 3GPP TSG RAN WG3 meeting #97, pp. 1/3-3/3, Aug. 21, 2017, Germany.

ZTE: "Miscellaneous corrections", 3GPP Draft; R2-1801617, 3GPP TSG-RAN WG2 AH#1801, Jan. 27, 2018, Canada.

ZTE: "Baseline CR for June version of RAN2 TS 37.340(RAN3 part) covering agreements of RAN3 #NR adhoc 1801", 3GPP Draft; R3-180663, 3GPP TSG-RAN WG3 NR AH#1801, Feb. 6, 2018, France.

3rd Generation Partnership Project; Technical Specification Group Radio Access Network; Study of separation of NR Control Plane (CP) and User Plane (UP) for split option 2; (Release 15), 3GPP TR 38.806 V15.0.0, Dec. 2017, 22 pages.

International Preliminary Report on Patentability; Written Opinion of the International Search Authority for PCT/JP2019/003344 dated Apr. 23, 2019.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| Data Usage Report list | M | | 9.3.x.x | | YES | reject |

FIG. 10

| IE/Group Name | Presence | Range | IE type and reference | Semantics description | Criticality | Assigned Criticality |
|---|---|---|---|---|---|---|
| Data usage report Item | | 1..maxnoof DRBs > | | | EACH | ignore |
| >DRB ID | M | | 9.3.1.8 | | - | - |
| >DRB Usage Report List | | 1 | | | - | - |
| >>DRB Usage Report Item | | 1..<maxno of time periods> | | | EACH | ignore |
| >>>Start timestamp | M | | OCTET STRING (SIZE(4)) | encoded in the same format as the first four octets of the 64-bit timestamp format as defined in section 6 of IETF RFC 5905 [xx]. It indicates the UTC time when the recording of the Secondary RAT Data Volume was started. | - | - |
| >>>End timestamp | M | | OCTET STRING (SIZE(4)) | encoded in the same format as the first four octets of the 64-bit timestamp format as defined in section 6 of IETF RFC 5905 [xx]. It indicates the UTC time when the recording of the Secondary RAT Data Volume was ended. | - | - |
| >>>Usage count UL | M | | INTEGER | The unit is: octets. | - | - |
| >>>Usage count DL | M | | INTEGER | The unit is: octets. | - | - |

FIG. 11

| Range bound | Explanation |
|---|---|
| maxnoofDRBs | Maximum no. of DRB allowed towards one UE, the maximum value is 64. |
| maxnoof time periods | Maximum no. of time reporting periods. Value is 2. |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| PSCell ID | O | | NCGI 9.3.1.12 | PSCell Identifier in SgNB | YES | Ignore |
| CU to DU RRC Information | M | | 9.3.1.25 | | YES | reject |
| DRX Cycle | O | | DRX Cycle 9.3.1.24 | | YES | ignore |
| Resource Coordination Transfer Container | O | | OCTET STRING | Includes the *MeNB Resource Coordination Information* IE as defined in subclause 9.1.X.1 of TS 36.423 [9]. | YES | reject |
| SCell To Be Setup List | | 0..1 | | | YES | ignore |
| ... | ... | ... | ... | ... | ... | ... |
| SRB to Be Setup List | | 0..1 | | | | |
| ... | ... | ... | ... | ... | YES | reject |
| DRB to Be Setup List | | 1 | | | | |
| ... | ... | ... | ... | ... | | |
| Data Usage report Indication | O | - | Boolean | TRUE corresponds to data usage report is required. | YES | reject |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| PSCell ID | O | | NCGI 9.3.1.12 | PSCell Identifier in SgNB | YES | Ignore |
| DRX Cycle | O | | DRX Cycle 9.3.1.24 | | YES | ignore |
| CU to DU RRC Information | O | | 9.3.1.25 | | YES | reject |
| Transmission Stop Indicator | O | | 9.3.1.11 | | YES | ignore |
| Resource Coordination Transfer Container | O | | OCTET STRING | Includes the *MeNB Resource Coordination Information* IE as defined in subclause 9.1.X.1 of TS 36.423 [9]. | YES | reject |
| RRC-Container | O | | 9.3.1.6 | | YES | ignore |
| SCell To Be Setup List | | 0..1 | | | YES | ignore |
| ... | ... | | | ... | ... | ... |
| DRB to Be Released List | | 0..1 | | | YES | reject |
| ... | ... | | | ... | ... | ... |
| Data Usage report Indication | O | - | Boolean | TRUE corresponds to data usage report is required. | YES | reject |

FIG. 14

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | en-gNB UE X2AP ID 9.2.100 | Allocated at the en-gNB. | YES | reject |
| Secondary RAT Usage Report list | M | | 9.2.120 | | YES | ignore |

FIG. 15

| IE/Group Name | Presence | Range | IE type and reference | Semantics description | Criticality | Assigned Criticality |
|---|---|---|---|---|---|---|
| Secondary RAT usage report Item | | 1..<maxnoofE-RABs> | | | EACH | ignore |
| >E-RAB ID | M | | 9.2.23 | | - | - |
| >Secondary RAT Type | M | | ENUMERAT ED (nR, ....) | | - | - |
| >E-RAB Usage Report List | | 1 | | | - | - |
| >>E-RAB Usage Report Item | | 1..<maxnoof time periods> | | | EACH | ignore |
| >>>Start timestamp | M | | OCTET STRING (SIZE(4)) | encoded in the same format as the first four octets of the 64-bit timestamp format as defined in section 6 of IETF RFC 5905 [35]. It indicates the UTC time when the recording of the Secondary RAT Data Volume was started. | - | - |
| >>>End timestamp | M | | OCTET STRING (SIZE(4)) | encoded in the same format as the first four octets of the 64-bit timestamp format as defined in section 6 of IETF RFC 5905 [35]. It indicates the UTC time when the recording of the Secondary RAT Data Volume was ended. | - | - |
| >>>Usage count UL | M | | INTEGER | The unit is: octets. | - | - |
| >>>Usage count DL | M | | INTEGER | The unit is: octets. | - | - |

FIG. 16

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmi-tted NR PDCP SN Ind | Highest Deliver-ed NR PDCP SN Ind | Final Frame Ind. | Lost Packet Report | 1 |
| Spare | | | | | | Data Usage Report | Cause Report | 1 |
| Desired buffer size for the data bearer | | | | | | | | 4 |
| Minimum desired buffer size for the UE | | | | | | | | 4 |
| Number of lost NR-U Sequence Number ranges reported | | | | | | | | 1 |
| Start of lost NR-U Sequence Number range | | | | | | | | 6* (Number of reported lost NR-U SN ranges) |
| End of lost NR-U Sequence Number range | | | | | | | | |
| Highest successfully delivered NR PDCP Sequence Number | | | | | | | | 3 |
| Highest transmitted NR PDCP Sequence Number | | | | | | | | 3 |
| Cause Value | | | | | | | | 1 |
| Data Usage UL | | | | | | | | 4 |
| Data Usage DL | | | | | | | | 4 |
| Spare extension | | | | | | | | 1-7 |

FIG. 18

FIRST UNIT, SECOND UNIT AND METHOD

BACKGROUND

Technical Field

The present disclosure relates to a first unit, a second unit and a method.

Background Art

In Third-Generation Partnership Project (3GPP) Release 15, E-UTRA-NR Dual Connectivity (EN-DC) has been specified (see NPL 1). According to EN-DC, a user equipment (UE) is connected to one evolved Node B (eNB) operating as a master node (MN) and an en-gNB operating as a secondary node (SN).

Further, Secondary RAT Data Usage Report function has been specified as a function of the EN-DC (see NPL 2). The en-gNB counts (measures) an amount of user data transported between the en-gNB and a UE using New Radio (NR) that is a secondary radio access technology (RAT) and reports the amount of data (data volume) to an MeNB (eNB which is an MN) with an X2AP:Secondary RAT Data Usage Report message.

[NPL 1] 3GPP TS 37.340 V15.0.0 (2017-12), "3rd Generation Partnership Project; Technical Specification Group Radio Access Network; Evolved Universal Terrestrial Radio Access (E-UTRA) and NR; Multi-connectivity; Stage 2 (Release 15)"

[NPL 2] 3GPP TS 36.423 V15.0.0 (2017-12), "3rd Generation Partnership Project; Technical Specification Group Radio Access Network; Evolved Universal Terrestrial Radio Access Network (E-UTRAN); X2 application protocol (X2AP) (Release 15)"

SUMMARY

However, how to realize the Secondary RAT Data Usage Report function has not been specified. More specifically, no method for an en-gNB that is an SN to obtain the amount of data has been specified.

An example object of the present disclosure is to provide a mechanism which makes it possible to report the amount of data from a secondary node (SN) to a master node (MN) in dual connectivity.

According to an example aspect of the present disclosure, there is provided a first unit of a central unit of a first base station. The first unit includes a controller and a transceiver. The central unit is configured to host at least PDCP layer in the first base station; and is connected to a distributed unit via a first interface, the distributed unit hosting RLC, MAC and PHY layers in the first base station. The controller is configured to host at least a user plane of the PDCP layer hosted by the central unit; and the transceiver is configured to transmit, to a second unit via a second interface, first information indicative of a volume of data processed by the first unit. The second unit is configured to host at least a control plane of the PDCP layer hosted by the central unit.

According to an example aspect of the present disclosure, there is provided a second unit of a central unit of a first base station. The second unit includes a controller and a transceiver. The central unit is configured to host at least PDCP layer in the first base station; and is connected to a distributed unit via a first interface, the distributed unit hosting RLC, MAC and PHY layers in the first base station. The controller is configured to host at least a control plane of the PDCP layer hosted by the central unit; and the transceiver is configured to receive, from a first unit via a second interface, first information indicative of a volume of data processed by the first unit. The first unit is configured to host at least a user plane of the PDCP layer hosted by the central unit.

According to an example aspect of the present disclosure, there is provided a method performed by a first unit of a central unit of a first base station. At least PDCP layer in the first base station is hosted by the central unit; and the central unit is connected to a distributed unit via a first interface, the distributed unit hosting RLC, MAC and PHY layers in the first base station. The method includes hosting at least a user plane of the PDCP layer hosted by the central unit; and transmitting to a second unit via a second interface, first information indicative of a volume of data processed by the first unit. The second unit is configured to host at least a control plane of the PDCP layer hosted by the central unit.

In an example aspect of the present disclosure, there may be provided a method including a process step to operate the above-described functions of the first unit, the second unit or the communication apparatus. In an example aspect of the present disclosure, there may be provided a program causing a processor to perform the method or a computer-readable non-transitory recording medium having stored thereon the program.

According to an example aspect of the present disclosure, it will be possible to report the amount of data from a secondary node (SN) to a master node (MN) in dual connectivity. Note that an example aspect of the present disclosure may exert other advantageous effects instead of the above advantageous effect or together with the above advantageous effect.

BRIEF DESCRIPTION OF THE DRAWINGS

FIG. 10 is the first explanatory diagram for describing an example of a DATA USAGE REPORT message according to the first example embodiment;

FIG. 11 is the second explanatory diagram for describing an example of the DATA USAGE REPORT message according to the first example embodiment;

FIG. 12 is the third explanatory diagram for describing an example of the DATA USAGE REPORT message according to the first example embodiment;

FIG. 13 is an explanatory diagram for describing an example of a UE CONTEXT SETUP REQUEST message according to the first example embodiment;

FIG. 14 is an explanatory diagram for describing an example of a UE CONTEXT MODIFICATION REQUEST message according to the first example embodiment;

FIG. 15 is a first explanatory diagram for describing an example of a SECONDARY RAT DATA USAGE REPORT message according to the first example embodiment;

FIG. 16 is a second explanatory diagram for describing an example of a SECONDARY RAT DATA USAGE REPORT message according to the first example embodiment;

FIG. 18 is an explanatory diagram for describing an example of a DL DATA DELIVERY STATUS frame according to an example alteration of the first example embodiment;

DESCRIPTION OF THE EXAMPLE EMBODIMENTS

Example embodiments of the present disclosure (hereinafter, referred to as "the present example embodiments") will be described in detail below with reference to the accompanying drawings. Note that, in the present Specification and drawings, elements to which similar descriptions are applicable are denoted by the same reference signs, whereby overlapping descriptions may be omitted.

Figure 1:
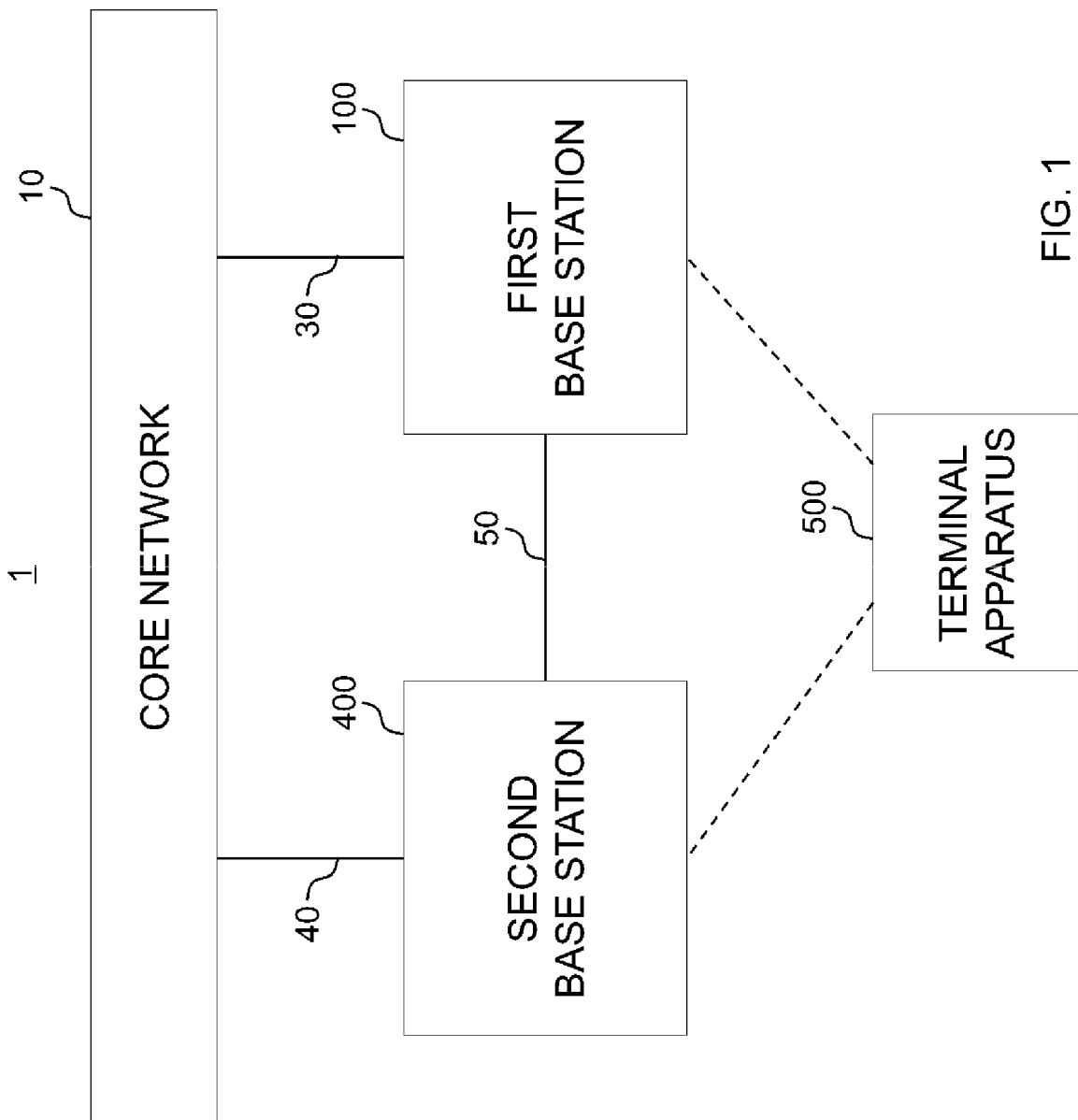
FIG. 1 is an explanatory diagram illustrating an example of a schematic configuration of a system according to example embodiments.

Descriptions will be given in the following order.
1. System Configuration
2. First Example Embodiment
2.1. Splitting First Base Station
2.2. Configuration of Each Node
   2.2.1. Configuration of Central Unit (CU)
   2.2.2. Configuration of Distributed Unit (DU)
   2.2.3. Configuration of Second Base Station
   2.2.4. Configuration of Terminal Apparatus
2.3. Technical Features
2.4. Example Alterations
3. Second Example Embodiment
3.1. Splitting First Base Station
3.2. Configuration of Each Node
   3.2.1. Configuration of Central Unit (CU)
   3.2.2. Configuration of Distributed Unit (DU)
3.3. Technical Features
3.4. Example Alterations
4. Third Example Embodiment
4.1. Splitting First Base Station
4.2. Configuration of Each Node
   4.2.1. Configuration of CU-CP
   4.2.2. Configuration of CU-UP
4.3. Technical Features
5. Fourth Example Embodiment
5.1. Configuration of Each Node
   5.1.1. Configuration of First Communication Apparatus
   5.1.2. Configuration of Second Communication Apparatus
   5.1.3. Configuration of Terminal Apparatus
5.2. Technical Features 1. System Configuration With reference to FIG. 1, an example configuration of a system 1 according to the example embodiments will be described. FIG. 1 is an explanatory diagram illustrating an example of a schematic configuration of the system 1 according to the example embodiments. Referring to FIG. 1, the system 1 includes a core network 10, a first base station 100, a second base station 400 and a terminal apparatus 500.

(1) Conformance to Standards/Specifications

For example, the system 1 is a system that conforms to 3GPP standards or specifications. More specifically, for example, the system 1 conforms to fifth generation (5G) or New Radio (NR) standards or specifications. The system 1 may also conform to Long Term Evolution (LTE) or System Architecture Evolution (SAE) standards or specifications. LTE herein may refer to LTE-Advanced or enhanced LTE (eLTE), to (normal) LTE or to any other variant of LTE.

(2) Interface

The first base station 100 communicates with the core network 10 via an interface 30. The second base station 400 communicates with the core network 10 via an interface 40.

As an example, the core network 10 is an Evolved Packet Core (EPC) (that is, a core network of fourth-generation (4G)). In this case, for example, the interface 30 and the interface 40 are S1-interfaces.

As another example, the core network 10 may be fifth-generation core network (5GC). In this case, the interface 30 and the interface 40 may be NG interfaces.

The first base station 100 and the second base station 400 may communicate with each other via an interface 50.

(3) Dual Connectivity

The first base station 100 communicates wirelessly with the terminal apparatus 500. The second base station 400 also communicates wirelessly with the terminal apparatus 500. The terminal apparatus 500 supports dual connectivity and, for example, is connected to the first base station 100 and the second base station 400 at the same time. Among others, in the example embodiments, the first base station 100 operates, for the terminal apparatus 500, as a secondary node (SN) of dual connectivity and the second base station 400 operates, for the terminal apparatus 500, as a master node (MN) of the dual connectivity.

In the example embodiments, the dual connectivity uses at least New Radio (NR) as a radio access technology (RAT). That is, at least one of the master node (the second base station 400) and the secondary node (the first base station 100) uses NR to communicate with the terminal apparatus 500. Note that NR mentioned above is a RAT of 3GPP fifth-generation (5G) and may be referred to as New RAT (NR), 5G NR (New Radio/RAT) or the like.

NR+LTE

For example, the dual connectivity may be dual connectivity which uses NR and LTE. That is, one of the master node (the second base station 400) and the secondary node (the first base station 100) uses NR to communicate with the terminal apparatus 500 and the other uses LTE to communicate with the terminal apparatus 500. As mentioned above, LTE herein may refer to LTE-Advanced or enhanced LTE (eLTE), to (normal) LTE or to any other variant of LTE.

EN-DC

As an example, the dual connectivity is EN-DC, the first base station 100 is an en-gNB and the second base station 400 is a master eNB (MeNB). That is, the second base station 400 (MeNB) being the master node (MN) uses LTE as a RAT to communicate with the terminal apparatus 500 and the first base station 100 (en-gNB) being the secondary node (SN) uses NR as a RAT to communicate with the terminal apparatus 500. In this case, the core network 10 is the EPC and the interface 50 between the first base station 100 and the second base station 400 is an X2 interface.

Figure 2:
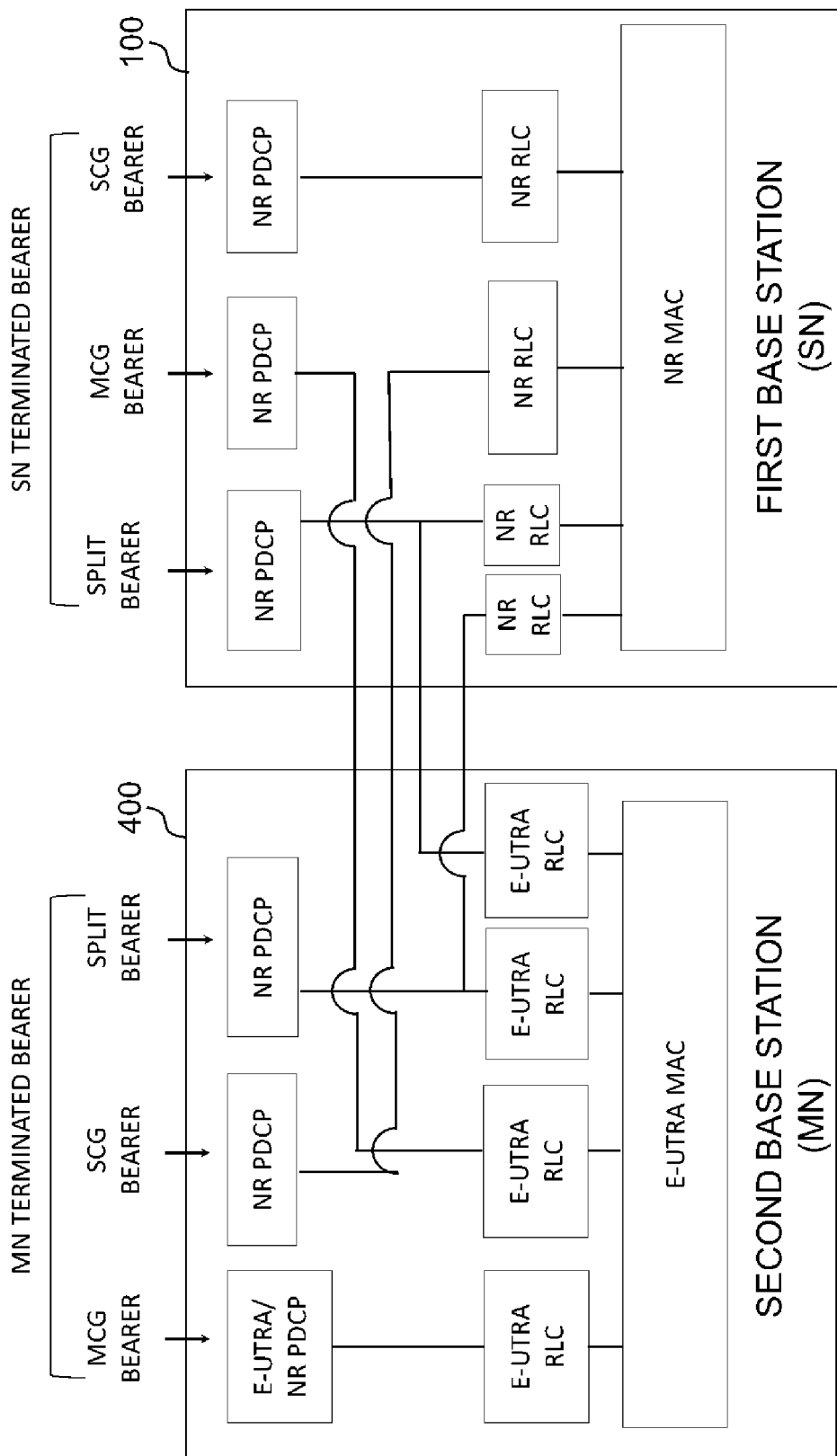
FIG. 2 is an explanatory diagram for describing an example of layered processing of respective radio bearers according to the example embodiments.

FIG. 2 is an explanatory diagram for describing an example of layered processing of respective radio bearers according to the example embodiments. Referring to FIG. 2, the first base station 100 (en-gNB) being the secondary node (SN), the second base station 400 (MeNB) being the master node (MN) and respective radio bearers are shown. There are radio bearers including MN Terminated bearers that are terminated at the MN (that is, PDCP thereof are located at the MN) and SN Terminated bearers that are terminated at the SN (that is, PDCP thereof are located at the SN). Further, the MN Terminated bearers includes a Master Cell Group (MCG) bearer, a Secondary Cell Group (SCG) bearer and a split bearer. Similarly, the SN Terminated bearers includes an MCG bearer, an SCG bearer and a split bearer. The MCG bearers are radio bearers having RLC bearers in MCG and processing of RLC layer, MAC layer and physical layer for the MCG bearers are performed at the MN (the second base station 400). The SCG bearers are radio bearers having RLC bearers in SCG and processing of RLC layer, MAC layer and physical layer for the SCG bearers are performed at the SN (the first base station 100). Split bearers are radio bearers having RLC bearers both in MCG and SCG and processing of RLC layer, MAC layer and physical layer for the Split bearers are performed both at the MN (the second base station 400) and the SN (the first base station 100).

Note that, though an example where the dual connectivity is the EN-DC has been described, the example embodiments are not limited to that example.

NGEN-DC

As an example, the dual connectivity may be NG-RAN E-UTRA-NR Dual Connectivity (NGEN-DC), the first base station 100 may be a gNB operating as an SN and the second base station 400 may be an ng-eNB operating as an MN. In this case, the core network 10 may be a 5GC and the interface 50 between the first base station 100 and the second base station 400 may be an Xn interface.

NE-DC

As another example, the dual connectivity may be NR-E-UTRA Dual Connectivity (NE-DC), the first base station 100 may be a ng-eNB operating as an SN and the second base station 400 may be a gNB operating as an MN. In this case, the core network 10 may be a 5GC and the interface 50 between the first base station 100 and the second base station 400 may be an Xn interface.

NR Only

Alternatively, the dual connectivity may be dual connectivity that uses NR (without using LTE). That is, both of the master node (the second base station 400) and the secondary node (the first base station 100) may use NR to communicate with the terminal apparatus 500. The first base station 100 may be a gNB operating as an SN and the second base station 400 may be a gNB operating as an MN. In this case, the core network 10 may be a 5GC and the interface 50 between the first base station 100 and the second base station 400 may be an Xn interface.

Note that the first base station 100 may be a base station of a first operator and the second base station 400 may be a base station of a second operator that is different from the first operator. That is, the dual connectivity may be dual connectivity between operators.

(4) Splitting of First Base Station

For example, the first base station 100 may include a central unit (CU) and one or more distributed units (DUs).

Figure 3:
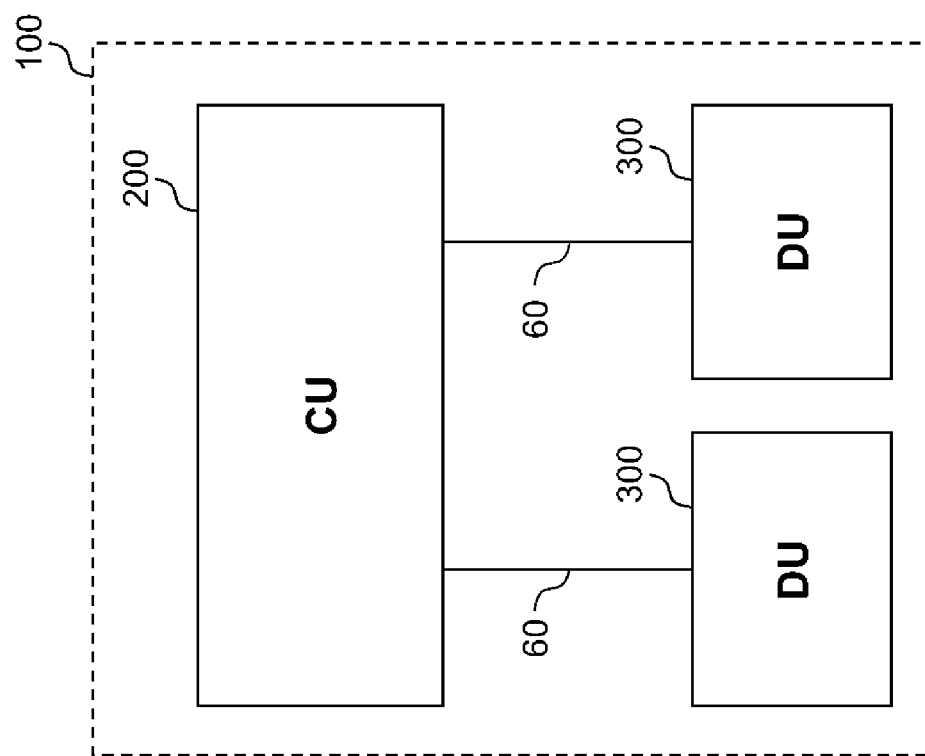
FIG. 3 is an explanatory diagram for describing an example of splitting a first base station according to the example embodiments.

FIG. 3 is an explanatory diagram for describing an example of splitting the first base station 100 according to an example embodiment. Referring to FIG. 3, the central unit (CU) 200 and the distributed units (DUs) 300 included in the first base station 100 are shown. The CU 200 and each DU 300 communicate with each other via the interfaces 60. Two DUs 300 are shown in this example, however, the first base station 100 may include three or more DUs 300 or include only one DU 300.

For example, a base station may be split by Higher Layer Split or Lower Layer Split. The following first example embodiment will be an example embodiment of the Higher Layer Split and the following second example embodiment will be an example embodiment of the Lower Layer Split.

Further, the central unit (CU) 200 may include a first central unit for a control plane and a second central unit for a user plane. The first central unit may be referred to as CU-CP and the second central unit may be referred to as CU-UP. The following third example embodiment will be an example embodiment especially focusing on the case of such splitting of the CU 200.

Alternatively, the CU 200 may be a first central unit (CU-CP) for a control plane or a second central unit (CU-UP) for a user plane.

2. First Example Embodiment

Next, the first example embodiment of the present invention will be described with reference to FIGS. 4 to 19.

2.1. Splitting First Base Station

First, splitting the first base station 100 according to the first example embodiment will be described with reference to FIGS. 4 and 5.

In the first example embodiment, the first base station 100 includes a central unit 200 and distributed units that perform processing of RLC and MAC layers. That is, in the first example embodiment, the first base station 100 is split by the Higher Layer Split.

Figure 4:
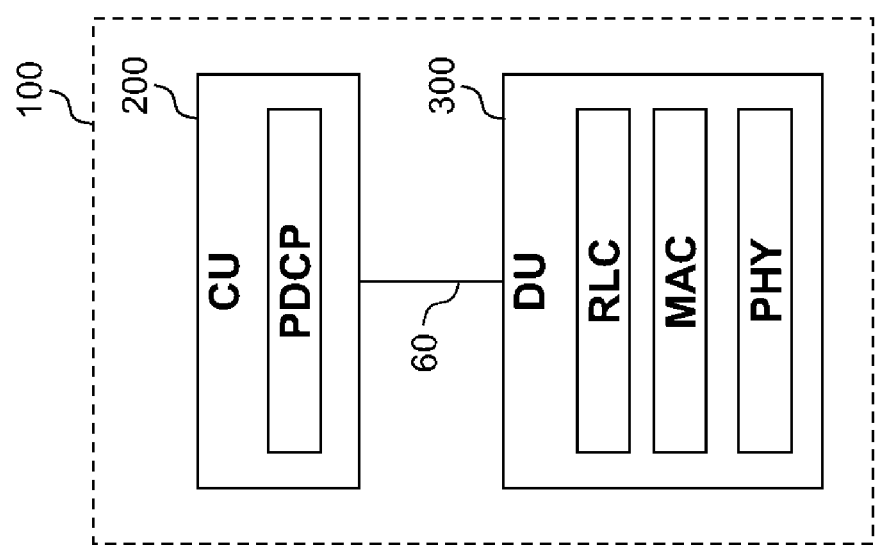
FIG. 4 is an explanatory diagram for describing an example of splitting the first base station according to a first example embodiment.

FIG. 4 is an explanatory diagram for describing an example of splitting the first base station 100 according to the first example embodiment. Referring to FIG. 4, the CU 200 and the DU 300 included in the first base station 100 are shown. The PDCP layer is located at the CU 200 and the RLC, MAC and physical (PHY) layers are located at the DU 300. That is, the CU 200 performs processing of the PDCP layer and the DU 300 performs processing of the RLC, MAC and PHY layers. In this case, the interface 60 is an F1 interface.

An example where the PDCP layer is located at the CU 200 has been described with reference to FIG. 4, however, Service Data Adaptation Protocol (SDAP) layer may be located at the CU 200, especially, in the case of NGEN-DC or NE-DC.

In such a case of Higher Layer Split, data transported between the SN (the first base station 100) and the terminal apparatus 500 through an MN Terminated bearer may be transported between the MN (the second base station 400) and the DU 300 of the SN by passing through the CU 200 of the SN (first example). Alternatively, such data may be transported between the MN (the second base station 400) and the DU 300 of the SN directly without passing through the CU 200 of the SN (second example).

Figure 5:
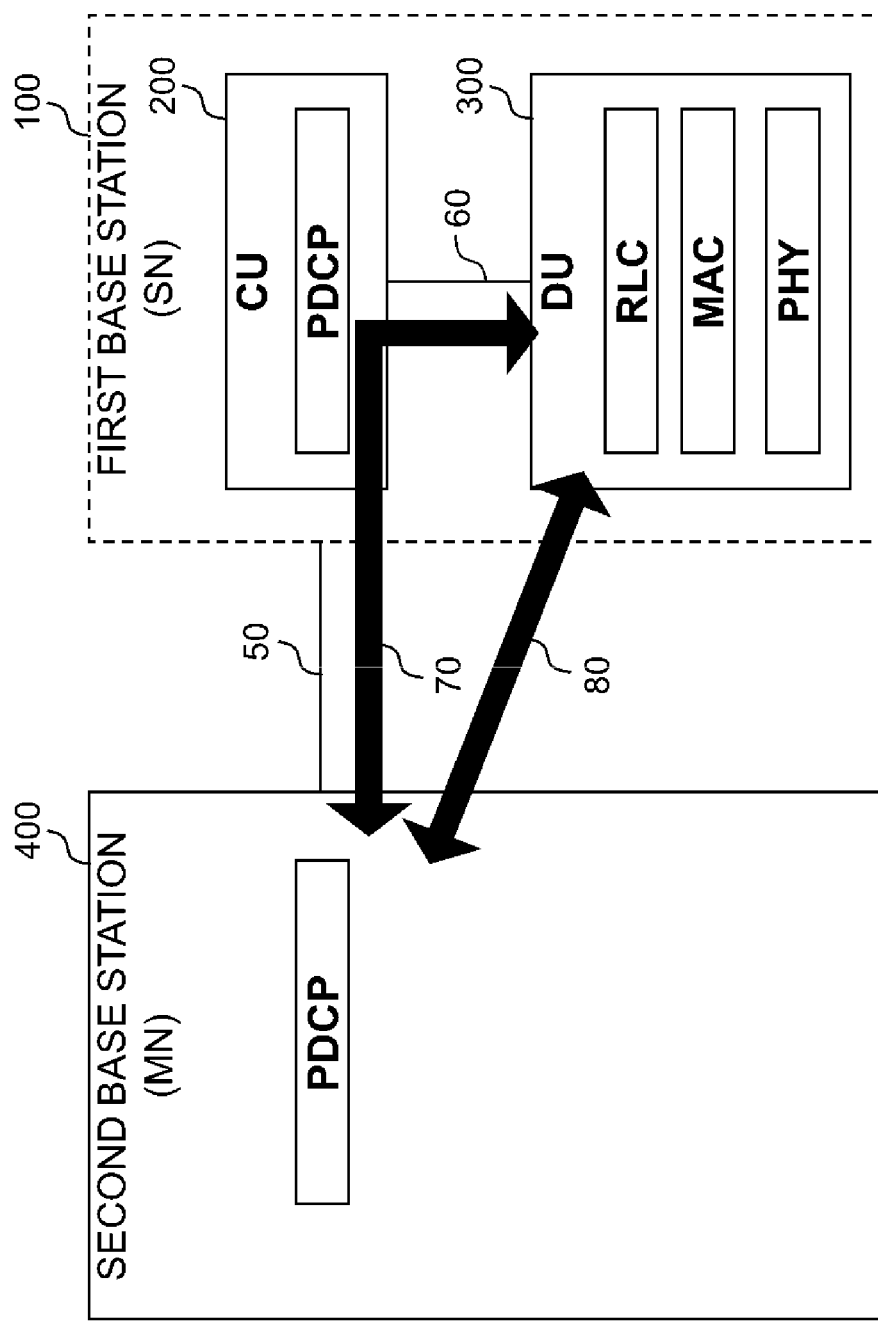
FIG. 5 is an explanatory diagram for describing an example of data route for an MN Terminated bearer according to the first example embodiment.

FIG. 5 is an explanatory diagram for describing an example of data route for an MN Terminated bearer according to the first example embodiment. Referring to FIG. 5, the CU 200 and the DU 300 included in the first base station 100 are shown along with the second base station 400. As a first example, the data transported between the SN (the first base station 100) and the terminal apparatus 500 through an MN Terminated bearer may be transported between the MN (the second base station 400) and the DU 300 of the SN by passing through the CU 200. That is, the data may be transported via the interface 50 (for example, X2-U) and the interface 60 (for example, F1-U) along the route 70. As a second example, the data may be transported between the MN (the second base station 400) and the DU 300 of the SN directly without passing through the CU 200. That is, the data may be transported along the route 80.

Note that, though an example of splitting the first base station 100 has been described, the second base station 400 may be split similarly to the first base station 100. Alternatively, a different splitting (for example, Lower Layer Split) than that for the first base station 100 (Higher Layer Split) may be applied to the second base station 400.

In the first example embodiment, for example, the CU 200 is a central unit both for the control plane (CP) and the user plane (UP). In this case, the CU 200 may be a single unit. Alternatively, the CU 200 may include a CU-CP which is a first central unit for the control plane and a CU-UP which is a second central unit for the user plane.

Alternatively, in the first example embodiment, the CU 200 may be the CU-CP which is the first central unit for the control plane. In this case, the first base station 100 may include the CU-UP which is the second central unit for the user plane separately from the CU-UP (CU 200).

2.2. Configuration of Each Node

Next, a configuration of each node will be described with reference to FIGS. 6 to 9.

2.2.1. Configuration of Central Unit (CU)

Figure 6:
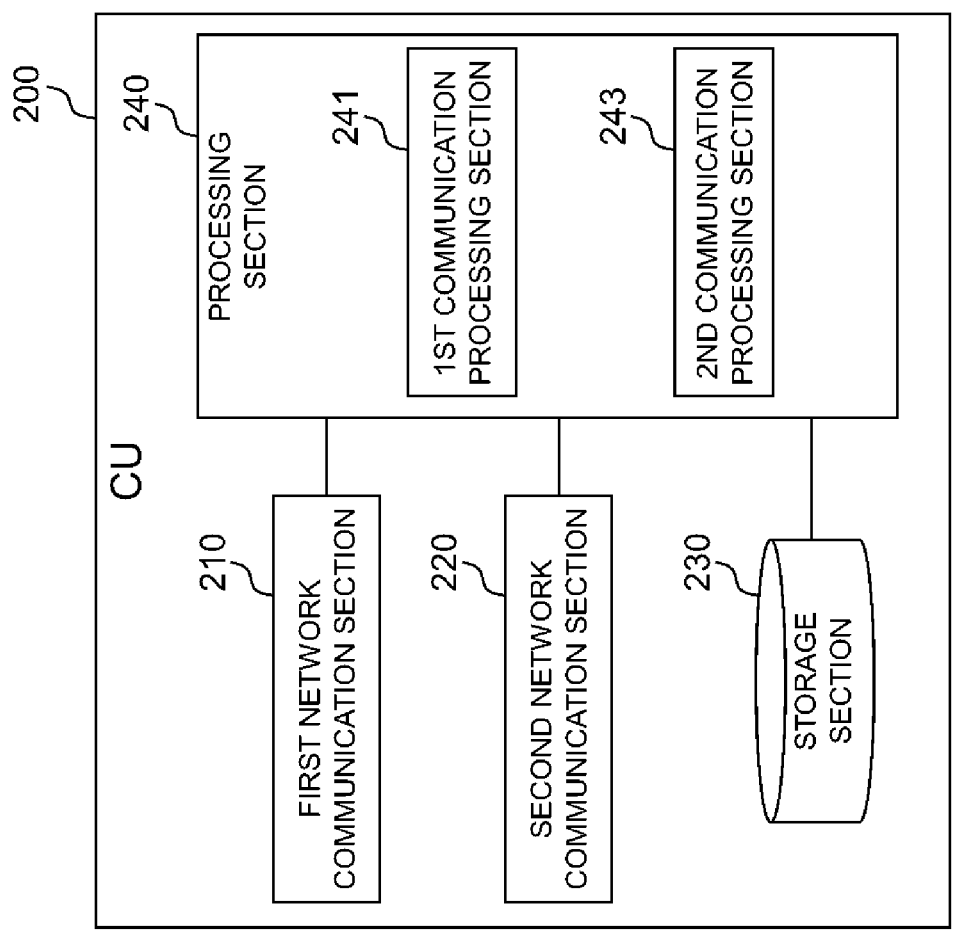
FIG. 6 is a block diagram illustrating an example of a schematic configuration of a CU according to the first example embodiment.

FIG. 6 is a block diagram illustrating an example of a schematic configuration of the CU 200 according to the first example embodiment. Referring to FIG. 6, the CU 200 includes a first network communication section 210, a second network communication section 220, a storage section 230 and a processing section 240.

(1) First Network Communication Section 210

The first network communication section 210 receives a signal from the DU 300 and transmits a signal to the DU 300.

(2) Second Network Communication Section 220

The second network communication section 220 receives a signal from the second base station 400 and transmits a signal to the second base station 400.

The second network communication section 220 may receive a signal from the core network 10 and transmit a signal to the core network 10.

(3) Storage Section 230

The storage section 230 stores a program (instructions) and parameters for operation of the CU 200 as well as various data temporarily or permanently. The program includes one or more instructions for operation of the CU 200.

(4) Processing Section 240

The processing section 240 provides various functions of the CU 200. The processing section 240 includes a first communication processing section 241 and a second communication processing section 243. Note that the processing section 240 may further include another constituent element than these constituent elements. That is, the processing section 240 may perform operations other than the operations of these constituent elements.

For example, the processing section 240 (the first communication processing section 241) communicates with the DU 300 via the first network communication section 210. For example, the processing section 240 (the second communication processing section 243) communicates with the second base station 400 (or the core network 10) via the second network communication section 220.

(5) Implementation Examples

Each of the first network communication section 210 and the second network communication section 220 may be implemented with a network adapter, a network interface card and/or the like. The storage section 230 may be implemented with a memory (for example, a non-volatile memory and/or a volatile memory), hard disc and/or the like. The processing section 240 may be implemented with one or more processors such as Base Band (BB) processors, another type of processors and/or the like. The first communication processing section 241 and the second communication processing section 243 may be implemented with the same processor or with respective different processors. The above memory (the storage section 230) may be included in the one or more processors or may be external to the one or more processors.

The CU 200 may include a memory that stores programs (instructions) and one or more processors that are capable of executing the programs (instructions). The one or more processors may execute the programs to perform operations of the processing section 240 (operations of the first communication processing section 241 and/or the second communication processing section 243). The programs may be programs for causing a processor to execute the operations of the processing section 240 (operations of the first communication processing section 241 and/or the second communication processing section 243).

Note that the CU 200 may be virtualized. That is, the CU 200 may be implemented as a virtual machine. In this case, the CU 200 (virtual machine) may operate as a virtual machine on a physical machine (hardware) including a processor, memory and the like and on a hypervisor.

2.2.2. Configuration of Distributed Unit (DU)

Figure 7:
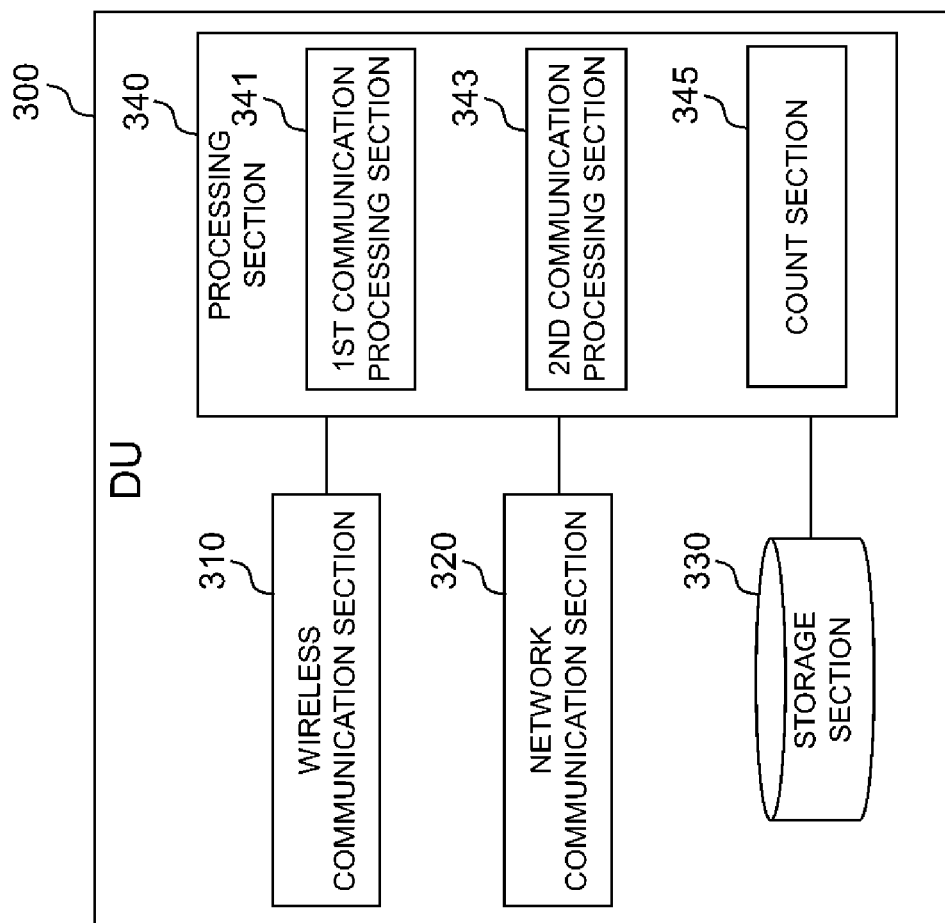
FIG. 7 is a block diagram illustrating an example of a schematic configuration of a DU according to the first example embodiment.

FIG. 7 is a block diagram illustrating an example of a schematic configuration of the DU 300 according to the first example embodiment. Referring to FIG. 7, the DU 300 includes a wireless communication section 310, a network communication section 320, a storage section 330 and a processing section 340.

(1) Wireless Communication Section 310

The wireless communication section 310 wirelessly transmits and receives signals. For example, the wireless communication section 310 receives a signal from the terminal apparatus 500 and transmits a signal to the terminal apparatus 500.

(2) Network Communication Section 320

The network communication section 320 receives a signal from the CU 200 and transmits a signal to the CU 200. The network communication section 320 may receive a signal from another node (for example, the second base station 400) and transmit a signal such another node.

(3) Storage Section 330

The storage section 330 stores a program (instructions) and parameters for operation of the DU 300 as well as various data temporarily or permanently. The program includes one or more instructions for operation of the DU 300.

(4) Processing Section 340

The processing section 340 provides various functions of the DU 300. The processing section 340 includes a first communication processing section 341, a second communication processing section 343 and a count section 345. The count section 345 may also be referred to as measurement section 345. Note that the processing section 340 may further include another constituent element than these constituent elements. That is, the processing section 340 may perform operations other than the operations of these constituent elements.

For example, the processing section 340 (the first communication processing section 341) communicates with the terminal apparatus 500 via the wireless communication section 310. For example, the processing section 340 (the second communication processing section 343) communicates with the CU 200 (or the second base station 400) via the network communication section 320.

(5) Implementation Examples

The wireless communication section 310 may be implemented with an antenna, a high frequency (Radio Frequency (RF)) circuit and the like and the antenna may be a directional antenna. The network communication section 320 may be implemented with a network adapter, a network interface card and/or the like. The storage section 330 may be implemented with a memory (for example, a non-volatile memory and/or a volatile memory), hard disc and/or the like. The processing section 340 may be implemented with one or more processors such as Base Band (BB) processors, another type of processors and/or the like. The first communication processing section 341, the second communication processing section 343 and the count section 345 may be implemented with the same processor or with respective different processors. The above memory (the storage section 330) may be included in the one or more processors or may be external to the one or more processors.

The DU 300 may include a memory that stores programs (instructions) and one or more processors that are capable of executing the programs (instructions). The one or more processors may execute the programs to perform operations of the processing section 340 (operations of the first communication processing section 341, the second communication processing section 343 and/or the count section 345). The programs may be programs for causing a processor to execute the operations of the processing section 340 (operations of the first communication processing section 341, the second communication processing section 343 and/or the count section 345).

Note that the DU 300 may be virtualized. That is, the DU 300 may be implemented as a virtual machine. In this case, the DU 300 (virtual machine) may operate as a virtual machine on a physical machine (hardware) including a processor, memory and the like and on a hypervisor.

2.2.3. Configuration of Second Base Station

Figure 8:
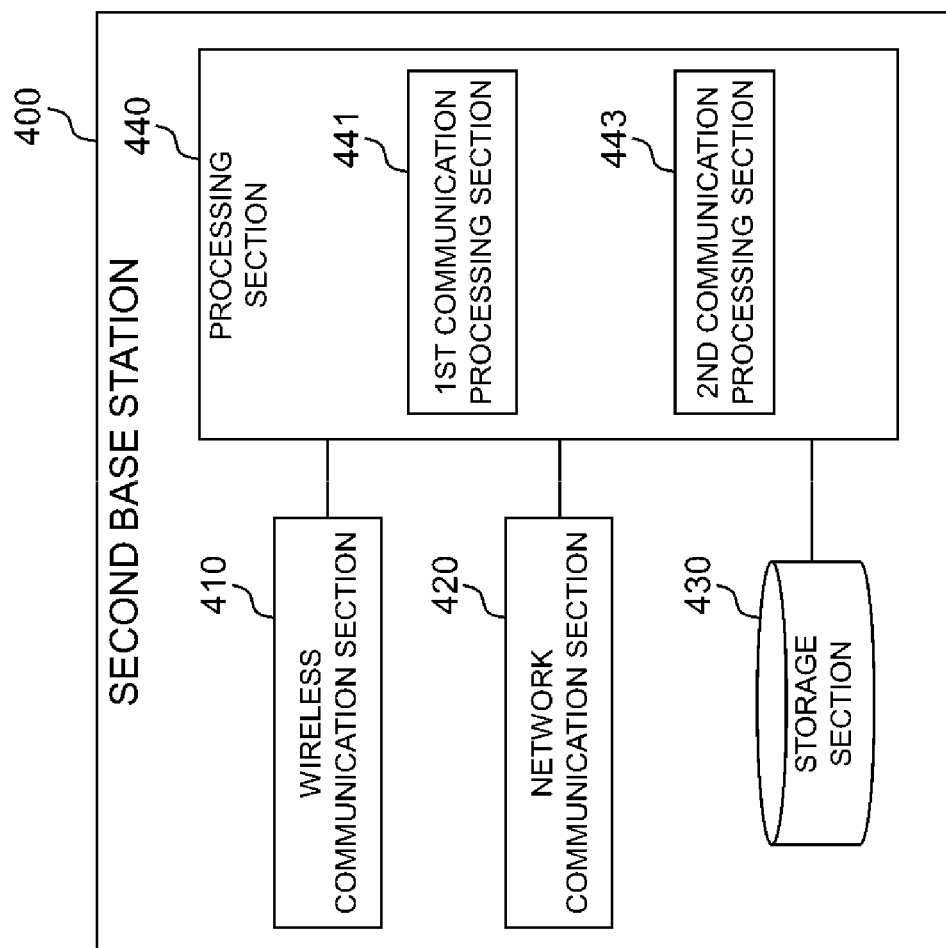
FIG. 8 is a block diagram illustrating an example of a schematic configuration of a second base station according to the first example embodiment.

FIG. 8 is a block diagram illustrating an example of a schematic configuration of the second base station 400 according to the first example embodiment. Referring to FIG. 8, the second base station 400 includes a wireless communication section 410, a network communication section 420, a storage section 430 and a processing section 440.

(1) Wireless Communication Section 410

The wireless communication section 410 wirelessly transmits and receives signals. For example, the wireless communication section 410 receives a signal from the terminal apparatus 500 and transmits a signal to the terminal apparatus 500.

(2) Network Communication Section 420

The network communication section 420 receives a signal from the first base station 100 or the core network 10 and transmits a signal to the first base station 100 or the core network 10.

(3) Storage Section 430

The storage section 430 stores a program (instructions) and parameters for operation of the second base station 400 as well as various data temporarily or permanently. The program includes one or more instructions for operation of the second base station 400.

(4) Processing Section 440

The processing section 440 provides various functions of the second base station 400. The processing section 440 includes a first communication processing section 441 and a second communication processing section 443. Note that the processing section 440 may further include another constituent element than these constituent elements. That is, the processing section 440 may perform operations other than the operations of these constituent elements.

For example, the processing section 440 (the first communication processing section 441) communicates with the terminal apparatus 500 via the wireless communication section 410. For example, the processing section 440 (the second communication processing section 443) communicates with the first base station 100 or the core network 10 via the network communication section 420.

(5) Implementation Examples

The wireless communication section 410 may be implemented with an antenna, a high frequency (RF) circuit and the like and the antenna may be a directional antenna. The network communication section 420 may be implemented with a network adapter, a network interface card and/or the like. The storage section 430 may be implemented with a memory (for example, a non-volatile memory and/or a volatile memory), hard disc and/or the like. The processing section 440 may be implemented with one or more processors such as Base Band (BB) processors, another type of processors and/or the like. The first communication processing section 441 and the second communication processing section 443 may be implemented with the same processor or with respective different processors. The above memory (the storage section 430) may be included in the one or more processors or may be external to the one or more processors.

The second base station 400 may include a memory that stores programs (instructions) and one or more processors that are capable of executing the programs (instructions). The one or more processors may execute the programs to perform operations of the processing section 440 (operations of the first communication processing section 441 and/or the second communication processing section 443). The programs may be programs for causing a processor to execute the operations of the processing section 440 (operations of the first communication processing section 441 and/or the second communication processing section 443).

The second base station 400 may include a central unit (CU) and a distributed unit (DU).

The CU may include the network communication section 420 and the second communication processing section 443 and the DU may include the wireless communication section 410 and the first communication processing section 441.

Note that the second base station 400 (or the CU or DU that is a part of the second base station 400) may be virtualized. That is, the second base station 400 (or the CU or DU that is a part of the second base station 400) may be implemented as a virtual machine. In this case, the second base station 400 (or the CU or DU that is a part of the second base station 400) (virtual machine) may operate as a virtual machine on a physical machine (hardware) including a processor, memory and the like and on a hypervisor.

2.2.4. Configuration of Terminal Apparatus

Figure 9:
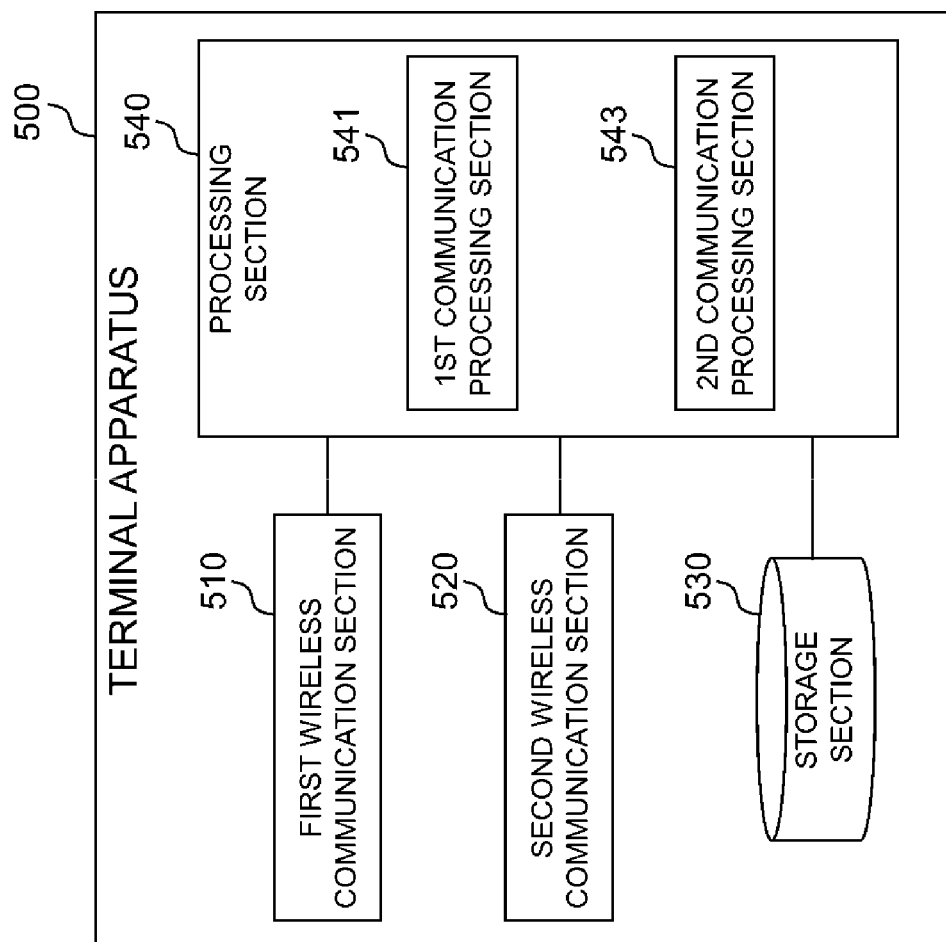
FIG. 9 is a block diagram illustrating an example of a schematic configuration of a terminal apparatus according to the first example embodiment.

FIG. 9 is a block diagram illustrating an example of a schematic configuration of the terminal apparatus 500 according to the first example embodiment. Referring to FIG. 9, the terminal apparatus 500 includes a first wireless communication section 510, a second wireless communication section 520, a storage section 530 and a processing section 540.

(1) First Wireless Communication Section 510

The first wireless communication section 510 wirelessly transmits and receives signals. For example, the first wireless communication section 510 receives a signal from the first base station 100 and transmits a signal to the first base station 100.

(2) Second Wireless Communication Section 520

The second wireless communication section 520 wirelessly transmits and receives signals. For example, the second wireless communication section 520 receives a signal from the second base station 400 and transmits a signal to the second base station 400.

(3) Storage Section 530

The storage section 530 stores a program (instructions) and parameters for operation of the terminal apparatus 500 as well as various data temporarily or permanently. The program includes one or more instructions for operation of the terminal apparatus 500.

(4) Processing Section 540

The processing section 540 provides various functions of the terminal apparatus 500. The processing section 540 includes a first communication processing section 541 and a second communication processing section 543. Note that the processing section 540 may further include another constituent element than these constituent elements. That is, the processing section 540 may perform operations other than the operations of these constituent elements.

For example, the processing section 540 (the first communication processing section 541) communicates with the first base station 100 via the first wireless communication section 510. For example, the processing section 540 (the second communication processing section 543) communicates with the second base station 400 via the second wireless communication section 520.

(5) Implementation Examples

Each of the first wireless communication section 510 and the second wireless communication section 520 may be implemented with an antenna, a high frequency (RF) circuit and the like. The storage section 530 may be implemented with a memory (for example, a non-volatile memory and/or a volatile memory), hard disc and/or the like. The processing section 540 may be implemented with one or more processors such as Base Band (BB) processors, another type of processors and/or the like. The first communication processing section 541 and the second communication processing section 543 may be implemented with the same processor or with respective different processors. The above memory (the storage section 530) may be included in the one or more processors or may be external to the one or more processors. As an example, the processing section 540 may be implemented in a System on Chip (SoC).

The terminal apparatus 500 may include a memory that stores programs (instructions) and one or more processors that are capable of executing the programs (instructions). The one or more processors may execute the programs to perform operations of the processing section 540 (operations of the first communication processing section 541 and/or the second communication processing section 543). The programs may be programs for causing a processor to execute the operations of the processing section 540 (operations of the first communication processing section 541 and/or the second communication processing section 543).

2.3. Technical Features

Next, with reference to FIGS. 10 to 17, examples of technical features of the first example embodiment will be described.

(1) Counting Amount of Data

For example, the first base station 100 operates, for the terminal apparatus 500, as a secondary node (SN) of dual connectivity which uses at least NR. In this case, the first base station 100 counts an amount of data transported between the first base station 100 and the terminal apparatus 500 at RLC layer or MAC layer.

Among others, in the first example embodiment, as described above, the DU 300 (the count section 345) performs processing of RLC layer and MAC layer and, thus, the DU 300 (the count section 345) counts the amount of data at RLC layer or MAC layer.

Note that the term "count" may be interchanged with a term "measure".

RLC/MAC

Specifically, for example, the DU 300 counts an amount of RLC or MAC packet data. For example, such packets may be service data units (SDU) of RLC or MAC. Alternatively, such packets may be protocol data units (PDU) of RLC or MAC.

Counted Data

For example, the data to be counted includes first data transported between the first base station 100 and the terminal apparatus 500 through at least one radio bearer terminated at the secondary node (SN) (that is, the first base station 100) of the dual connectivity. Moreover, for example, the data to be counted includes second data transported between the first base station 100 and the terminal apparatus 500 through at least one radio bearer terminated at a master node (MN) (that is, the second base station 400) of the dual connectivity.

For example, the at least one radio bearer terminated at the SN (the first base station 100) includes SN Terminated bearers and the at least one radio bearer terminated at the MN (the second base station 400) includes MN Terminated bearers. More specifically, for example, the first data is data transported between the first base station 100 and the terminal apparatus 500 through a Split bearer and an SCG bearer out of the SN Terminated bearers. The second data is data transported between the first base station 100 and the terminal apparatus 500 through a Split bearer and an SCG bearer out of the MN Terminated bearers.

Bearer/QoS Flow

For example, counting the amount of data is done per bearer basis. The bearer herein may be a radio bearer (RB) (for example, data radio bearer (DRB)) or may be a radio access bearer (RAB). Alternatively, counting the amount of data may be done per QoS flow basis.

This, for example, makes it possible for the SN to count the amount of data independently of bearers even if there is a complicated data processing route due to various bearers. Thus, the SN can report the amount of data to the MN.

(2) Transmitting Data Amount Information by DU

For example, the DU 300 (the second communication processing section 343) transmits data amount information that indicates the (counted) amount of the data.

How to Transmit

For example, the DU 300 (the second communication processing section 343) transmits a signaling message including the data amount information to the CU 200. For example, the DU 300 (the second communication processing section 343) transmits the signaling message to the CU 200 via the interface 60 (F1 interface).

For example, the signaling message is a DATA USAGE REPORT message. In the first example embodiment, the DATA USAGE REPORT message. may be transmitted in an Elementary Procedure. The Elementary Procedure is a unit representing an interaction between a gNB-CU and a gNB-DU.

For example, the data amount information corresponds to Usage count Information Elements (IE) and, more specifically, corresponds to Usage count UL IE and Usage count DL IE. The Usage count UL and the Usage count DL may be referred to as Data Usage UL and Data Usage DL, respectively. The data amount information may be data usage volume.

FIGS. 10, 11 and 12 are explanatory diagrams for describing examples of a DATA USAGE REPORT message according to the first example embodiment. FIG. 10 shows content of a DATA USAGE REPORT message where the DATA USAGE REPORT message includes Data Usage Report list (that is, the IE that provides information related to resources used in dual connectivity using at least NR). FIG. 11 shows content of Data Usage Report list where the Data Usage Report list includes Usage count UL IE and Usage count DL IE (that is, the counted amount of data). Note that FIG. 12 provides supplementary information for FIG. 11.

This, for example, makes it possible for the CU 200 to be aware of the amount of data even if the amount of data is counted at the DU 300.

As also illustrated in FIG. 11, for example, the data amount information includes information per bearer (information indicative of amount of data per bearer basis). The bearer herein may be a radio bearer (RB) (for example, data radio bearer (DRB)) or may be a radio access bearer (RAB). Alternatively, the data amount information may include information per QoS flow (information indicative of amount of data per QoS flow basis).

Transmission in Response to Instruction from CU

For example, the DU 300 (the second communication processing section 343) transmits the data amount information in response to an instruction from the CU 200.

Specifically, for example, the CU 200 (the first communication processing section 241) transmits a signaling message including an instruction for transmission of the data amount information to the DU 300. Then, the DU 300 (the second communication processing section 343) transmits the data amount information in response to that signaling message.

For example, the signaling message may be a UE CONTEXT SETUP REQUEST message or a UE CONTEXT MODIFICATION REQUEST message. For example, the instruction may be Data Usage report Indication IE.

FIG. 13 is an explanatory diagram for describing an example of a UE CONTEXT SETUP REQUEST message according to the first example embodiment. FIG. 14 is an explanatory diagram for describing an example of a UE CONTEXT MODIFICATION REQUEST message according to the first example embodiment. Referring to FIGS. 13 and 14, each of the UE CONTEXT SETUP REQUEST message and the UE CONTEXT MODIFICATION REQUEST message (that is, a signaling message) includes Data Usage report Indication IE (instruction for transmission of the data amount information). The Data Usage report Indication IE (instruction for transmission of the data amount information) is a Boolean value and indicates, when it is TRUE, for example, that a signaling message including data amount information is required.

This, for example, makes it possible for the CU 200 to control the DU 300 to report the data amount information.

Note that the DU 300 (the second communication processing section 343) may not receive an instruction from the CU 200 (instruction for transmission of data amount information) and may transmit the data amount information without such an instruction from the CU 200. In this case, an Operations, Administration and Maintenance (OAM) may configure such as whether transmission of the data amount information (that is, data amount reporting) is to be done or not and a timing when to transmit the data amount information (that is, when to report the amount of data).

(3) Transmitting Data Amount Information by CU

For example, the CU 200 (the first communication processing section 241) receives the data amount information from the DU 300. Specifically, the CU 200 (the first communication processing section 241) receives a signaling message including the data amount information from the DU 300.

For example, the CU 200 (the second communication processing section 243) transmits, to the second base station 400, a message for which the data amount information is used.

For example, the message includes the data amount information. Alternatively, the message may include some other data amount information (for example, information of aggregated amount of data) generated (by the CU 200) on the basis of the received data amount information.

For example, the dual connectivity is EN-DC, the interface 50 between the first base station 100 and the second base station 400 is an X2 interface and the above message is an X2 message. More specifically, for example, the message is a Secondary RAT Data Usage Report message.

FIGS. 15 and 16 are explanatory diagrams for describing examples of a SECONDARY RAT DATA USAGE REPORT message according to the first example embodiment. FIG. 15 shows contents of a SECONDARY RAT DATA USAGE REPORT message where the SECONDARY RAT DATA USAGE REPORT includes Secondary RAT Usage Report list. FIG. 16 shows contents of the Secondary RAT Usage Report list where the Secondary RAT Usage Report list includes Usage count UL IE and Usage count DL IE (that is, the counted amount of data).

(4) Transmitting Data Amount Information by Second Base Station

For example, the second base station 400 (the first communication processing section 441) receives, from the first base station 100 (the CU 200), the message for which the data amount information is used (for example, the message including the data amount information).

For example, the second base station 400 (the second communication processing section 443) transmits, to the core network 10, the message for which the data amount information is used.

For example, the message transmitted to the core network 10 includes the data amount information. Alternatively, the message transmitted to the core network 10 may include some other data amount information (for example, information of aggregated amount of data) generated (by the CU 200 and/or the second base station 400) on the basis of the data amount information.

For example, the dual connectivity is EN-DC, the interface 40 between the second base station 400 and the core network 10 is an S1 interface and the above message is an S1 message. More specifically, for example, the message is a SECONDARY RAT REPORT message and includes Usage count UL IE and Usage count DL IE (that is, the counted amount of data).

(5) Process Flow

Figure 17:
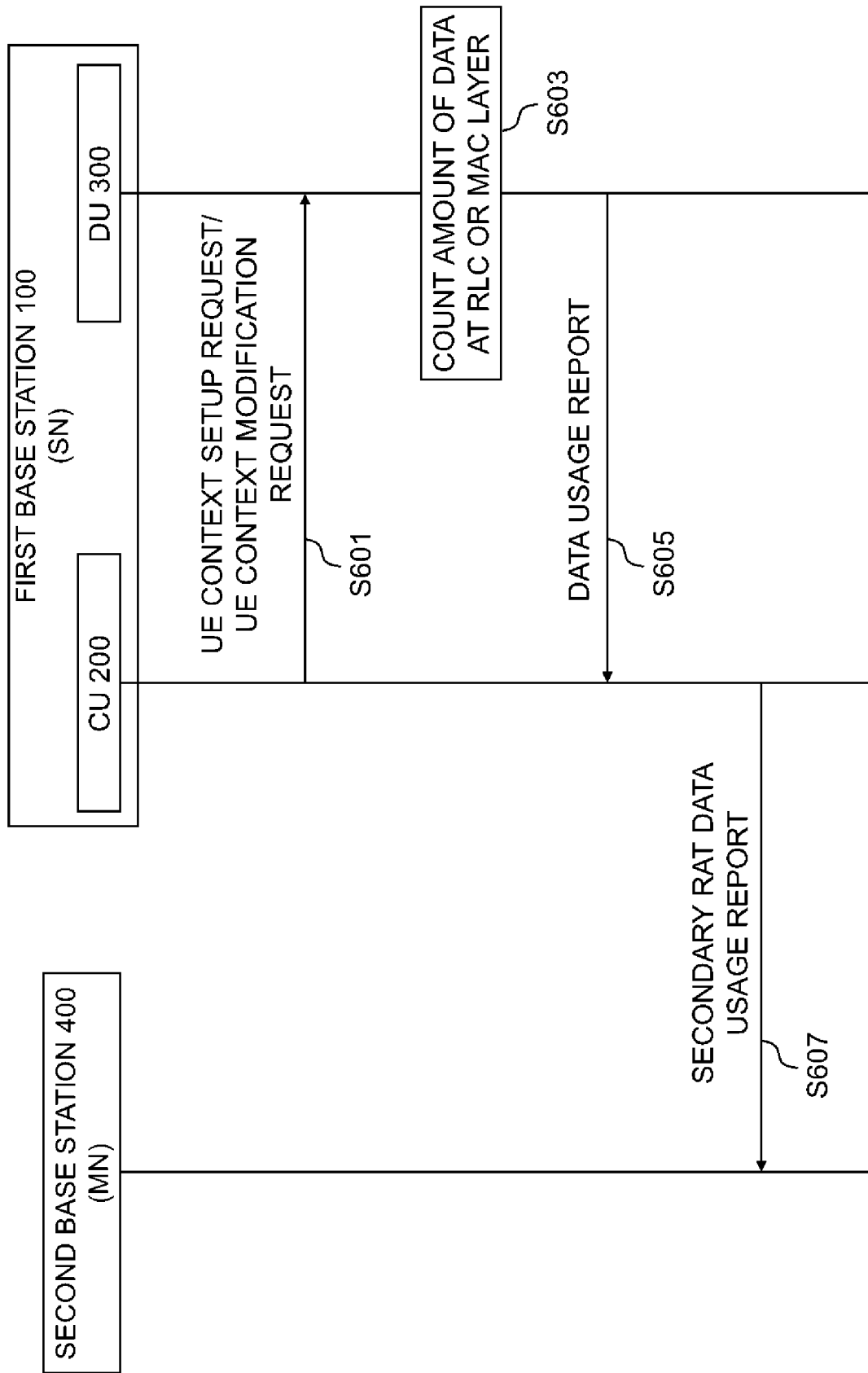
FIG. 17 is a sequence diagram for describing an example of a schematic flow of a process according to the first example embodiment.

FIG. 17 is a sequence diagram for describing an example of a schematic flow of a process according to the first example embodiment.

The CU 200 transmits, to the DU 300, a UE CONTEXT SETUP REQUEST message or a UE CONTEXT MODIFICATION REQUEST message including Data Usage report Indication IE (instruction for transmission of data amount information) (S601).

The DU 300 counts an amount of data transported between the first base station 100 (SN) and the terminal apparatus 500 at RLC layer or MAC layer (S603).

The DU 300 transmits, to the CU 200, a DATA USAGE REPORT message including data amount information that indicates the counted amount of the data (Usage count UL IE and Usage count DL IE) (S605).

The CU 200 transmits, to the second base station 400, a SECONDARY RAT DATA USAGE REPORT message for which the data amount information is used (a SECONDARY RAT DATA USAGE REPORT message including Usage count UL IE and Usage count DL IE) (S607).

Note that the second base station 400 may further transmits, to the core network 10, a SECONDARY RAT REPORT message for which the data amount information is used (a SECONDARY RAT REPORT message including Usage count UL IE and Usage count DL IE).

The step S601 may be omitted from among the above-described process steps. That is, as mentioned above, the DU 300 may not receive an instruction from the CU 200 (an instruction for transmission of data amount information) (Data Usage report Indication IE) and may transmit the data amount information without such an instruction from the CU 200.

2.4. Example Alterations

Next, with reference to FIGS. 18 and 19, example alterations of the first example embodiment will be described. In the following, differences between the above-described examples in the first example embodiment and each example alteration will be described.

(1) Transmitting Data Amount Information by DU

How to Transmit

In the above-described example of the first example embodiment, the DU 300 (the second communication processing section 343) transmits a signaling message including the data amount information to the CU 200. However, the first example embodiment is not limited to such an example.

Among others, in an example alteration of the first example embodiment, the DU 300 (the second communication processing section 343) transmits a user plane frame including the data amount information.

Specifically, for example, the DU 300 (the second communication processing section 343) transmits, to the CU 200, a user plane frame including first data amount information indicative of an amount of first data transported between the first base station 100 and the terminal apparatus 500 through at least one radio bearer terminated at the secondary node (SN) (the first base station 100) of the dual connectivity. For example, the at least one radio bearer terminated at the SN (the first base station 100) includes SN Terminated bearers. For example, the first data is data transported between the first base station 100 and the terminal apparatus 500 through a Split bearer and an SCG bearer out of the SN Terminated bearers.

Moreover, for example, the DU 300 (the second communication processing section 343) transmits, to the second base station 400, a user plane frame including second data amount information indicative of an amount of second data transported between the first base station 100 and the terminal apparatus 500 through at least one radio bearer terminated at the master node (MN) (the second base station 400) of the dual connectivity. The DU 300 (the second communication processing section 343) may transmit the user plane frame including the second data amount information to the second base station 400 via the CU 200 or may transmit it directly to the second base station 400 without involving the CU 200. For example, the at least one radio bearer terminated at the MN (the second base station 400) includes MN Terminated bearers. For example, the second data is data transported between the first base station 100 and the terminal apparatus 500 through a Split bearer and an SCG bearer out of the MN Terminated bearers.

For example, the user plane frame is a GPRS Tunneling Protocol User Plane (GTP-U) frame. Specifically, for example, the user plane frame is a DL DATA DELIVERY STATUS frame.

FIG. 18 is an explanatory diagram for describing an example of a DL DATA DELIVERY STATUS frame according to an example alteration of the first example embodiment. Referring to FIG. 18, a DL DATA DELIVERY STATUS frame includes Data Usage UL and Data Usage DL (which may be referred to as Usage count UL and Usage count DL).

Whether each of NR user plane frames corresponding to a DL DATA DELIVERY STATUS frame includes Data Usage UL and Data Usage DL or not may be indicated by the value of "0" or "1" of Data Usage Report IE, for example. In a case where the frame does not include Data Usage UL and Data Usage DL, that value may be "0" and, in a case where it includes Data Usage UL and Data Usage DL, that value may be "1".

Further, for example, a new PDU Type may be defined as a PDU Type separately from the PDU Type for a DL DATA DELIVERY STATUS frame shown in FIG. 18.

(2) Transmitting Data Amount Information by CU

For example, the CU 200 (the first communication processing section 241) receives the first data amount information from the DU 300. Specifically, the CU 200 (the first communication processing section 241) receives the user plane frame including the first data amount information from the DU 300.

For example, the CU 200 (the second communication processing section 243) transmits, to the second base station 400, a message for which the first data amount information is used (for example, a message including the first data amount information).

As such, in the example alteration of the first example embodiment, the first data amount information is transmitted from the DU 300 to the CU 200 and, thus, the first data amount information is used for a message transmitted by the CU 200 to the second base station 400. Meanwhile, the second data amount information is transmitted from the DU 300 not to the CU 200 but to the second base station 400 and, thus, the second data amount information is not used for the message transmitted by the CU 200 to the second base station 400.

This, for example, makes it possible to restrict the report made from the SN to the MN to necessary and sufficient extent.

(3) Transmitting Data Amount Information by Second Base Station

For example, the second base station 400 (the first communication processing section 441) receives, from the first base station 100 (the CU 200), the message for which the first data amount information is used (for example, the message including the first data amount information). The second base station 400 (the first communication processing section 441) receives, from the first base station 100 (the DU 300), a user plane frame including the second data amount information.

For example, the second base station 400 (the second communication processing section 443) further transmits, to the core network 10, a message for which the first and second data amount information is used.

For example, the message transmitted to the core network 10 includes the first and second data amount information. Alternatively, the message transmitted to the core network 10 may include some other data amount information (for example, information of aggregated amount of data) generated (by the second base station 400) on the basis of the first and second data amount information.

(4) Process Flow

Figure 19:
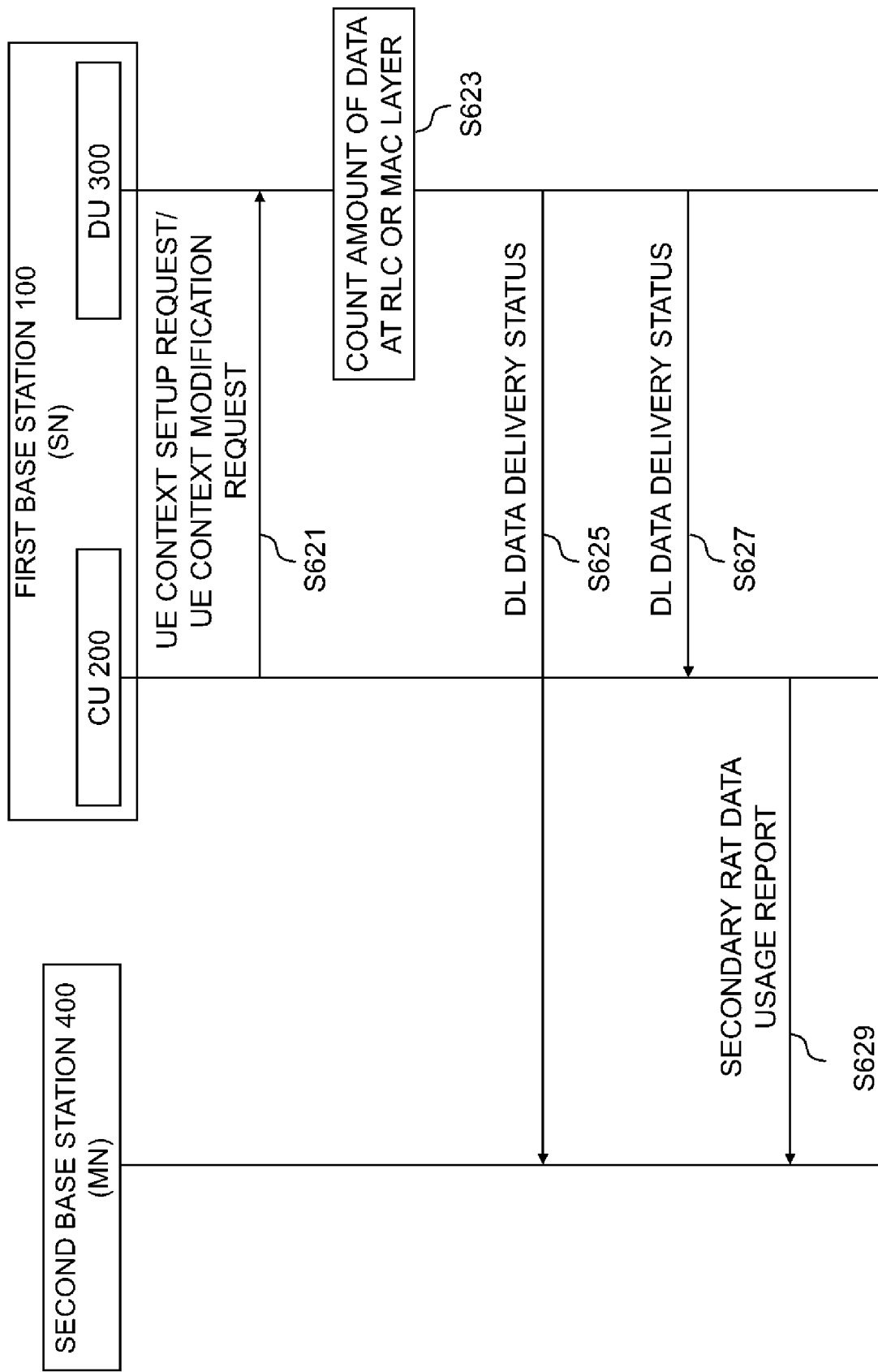
FIG. 19 is a sequence diagram for describing an example of a schematic flow of a process according to the example alteration of the first example embodiment.

FIG. 19 is a sequence diagram for describing an example of a schematic flow of a process according to the example alteration of the first example embodiment.

The CU 200 transmits, to the DU 300, a UE CONTEXT SETUP REQUEST message or a UE CONTEXT MODIFICATION REQUEST message including Data Usage report Indication IE (instruction for transmission of data amount information) (S621).

The DU 300 counts an amount of data transported between the first base station 100 (SN) and the terminal apparatus 500 at RLC layer or MAC layer (S623). Specifically, the DU 300 counts an amount of first data transported between the first base station 100 (SN) and the terminal apparatus 500 through SN Terminated bearers and count an amount of second data transported between the first base station 100 (SN) and the terminal apparatus 500 through MN Terminated bearers.

The DU 300 transmits, to the second base station 400, a DL DATA DELIVERY STATUS frame including second data amount information that indicates the counted amount of the second data (Usage count UL and Usage count DL) (S625). The DU 300 also transmits, to the CU 200, a DL DATA DELIVERY STATUS frame including first data amount information that indicates the counted amount of the first data (Usage count UL and Usage count DL) (S627).

The CU 200 transmits, to the second base station 400, a SECONDARY RAT DATA USAGE REPORT message for which the first data amount information is used (a SECONDARY RAT DATA USAGE REPORT message including Usage count UL IE and Usage count DL IE) (S629).

Note that the second base station 400 may further transmits, to the core network 10, a SECONDARY RAT REPORT message for which the first and second data amount information is used (a SECONDARY RAT REPORT message including Usage count UL IE and Usage count DL IE).

The step S621 may be omitted from among the above-described process steps. That is, as mentioned above, the DU 300 may not receive an instruction from the CU 200 (an instruction for transmission of data amount information) (Data Usage report Indication IE) and may transmit the data amount information without such an instruction from the CU 200.

3. Second Example Embodiment

Next, the second example embodiment of the present invention will be described with reference to FIGS. 20 to 24.

3.1. Splitting First Base Station

First, splitting the first base station 100 according to the second example embodiment will be described with reference to FIG. 20.

In the second example embodiment, the first base station 100 includes a central unit 200 that performs processing of RLC and MAC layers and a distributed unit. That is, in the second example embodiment, the first base station 100 is split by the Lower Layer Split.

Figure 20:
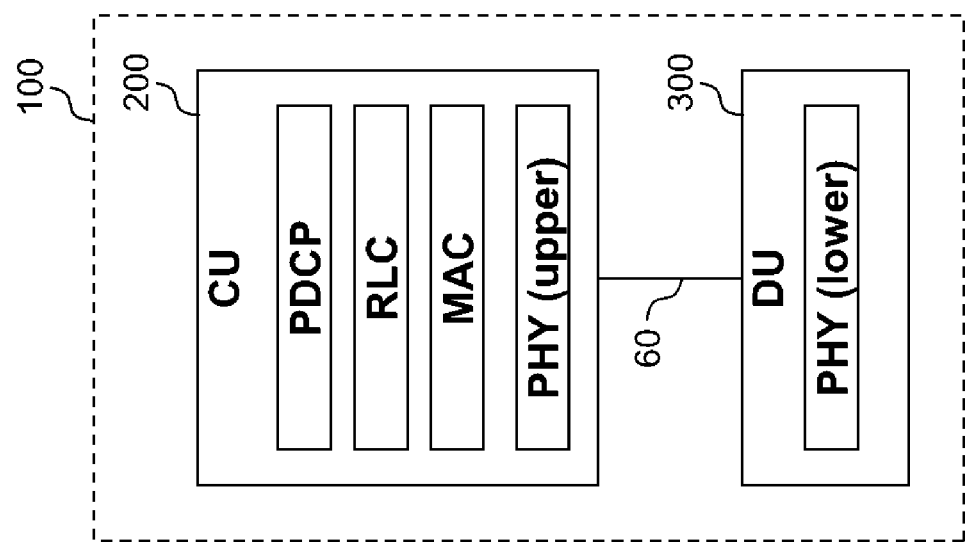
FIG. 20 is an explanatory diagram for describing an example of splitting a first base station according to a second example embodiment.

FIG. 20 is an explanatory diagram for describing an example of splitting the first base station 100 according to the second example embodiment. Referring to FIG. 20, the CU 200 and the DU 300 included in the first base station 100 are shown. The PDCP, RLC and MAC layers and (upper part of) physical (PHY) layer are located at the CU 200 and (lower part of) PHY layer is located at the DU 300. That is, the CU 200 performs processing of the PDCP, RLC and MAC layers and (upper part of) PHY layer and the DU 300 performs processing of the (lower part of) PHY layer.

Note that, though an example of splitting the first base station 100 has been described, the second base station 400 may be split similarly to the first base station 100. Alternatively, a different splitting (for example, Higher Layer Split) than that for the first base station 100 (Lower Layer Split) may be applied to the second base station 400.

3.2. Configuration of Each Node

Next, a configuration of each node will be described with reference to FIGS. 21 and 22.

Note that the configuration of the second base station 400 according to the second example embodiment is, for example, the same as the configuration of the second base station 400 according to the first example embodiment. The configuration of the terminal apparatus 500 according to the second example embodiment is also, for example, the same as the configuration of the terminal apparatus 500 according to the first example embodiment. Hence, duplicate descriptions are herein omitted.

3.2.1. Configuration of Central Unit (CU)

Figure 21:
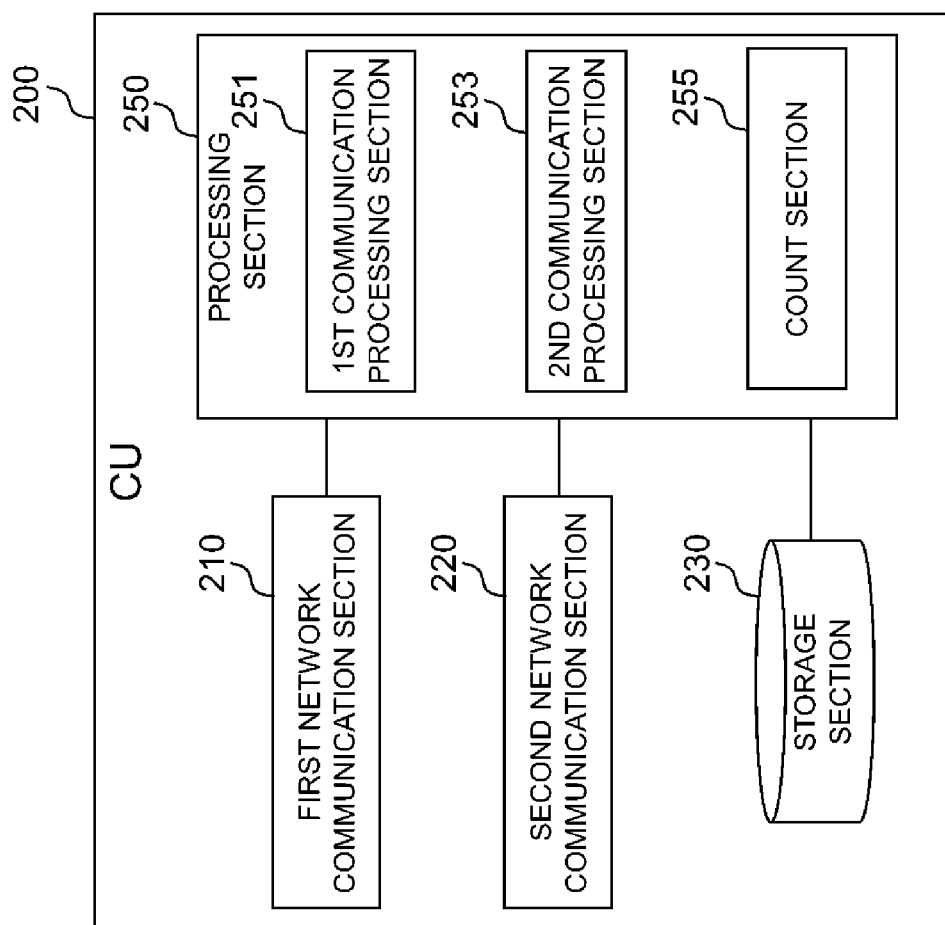
FIG. 21 is a block diagram illustrating an example of a schematic configuration of a CU according to the second example embodiment.

FIG. 21 is a block diagram illustrating an example of a schematic configuration of the CU 200 according to the second example embodiment. Referring to FIG. 21, the CU 200 includes a first network communication section 210, a second network communication section 220, a storage section 230 and a processing section 250.

There is no difference between the first and second example embodiments in descriptions for the first network communication section 210, the second network communication section 220 and the storage section 230. Hence, duplicate descriptions are herein omitted.

(1) Processing Section 250

The processing section 250 provides various functions of the CU 200. The processing section 250 includes a first communication processing section 251, a second communication processing section 253 and a count section 255. The count section 255 may also be referred to as measurement section 255. Note that the processing section 250 may further include another constituent element than these constituent elements. That is, the processing section 250 may perform operations other than the operations of these constituent elements.

For example, the processing section 250 (the first communication processing section 251) communicates with the DU 300 via the first network communication section 210. For example, the processing section 250 (the second communication processing section 253) communicates with the second base station 400 (or the core network 10) via the second network communication section 220.

(2) Implementation Examples

The processing section 250 may be implemented with one or more processors such as Base Band (BB) processors, another type of processors and/or the like. The first communication processing section 251, the second communication processing section 253 and the count section 255 may be implemented with the same processor or with respective different processors. The memory (the storage section 230) may be included in the one or more processors or may be external to the one or more processors.

The CU 200 may include a memory that stores programs (instructions) and one or more processors that are capable of executing the programs (instructions). The one or more processors may execute the programs to perform operations of the processing section 250 (operations of the first communication processing section 251, the second communication processing section 253 and/or the count section 255). The programs may be programs for causing a processor to execute the operations of the processing section 250 (operations of the first communication processing section 251, the second communication processing section 253 and/or the count section 255).

Note that the CU 200 may be virtualized. That is, the CU 200 may be implemented as a virtual machine. In this case, the CU 200 (virtual machine) may operate as a virtual machine on a physical machine (hardware) including a processor, memory and the like and on a hypervisor.

3.2.2. Configuration of Distributed Unit (DU)

Figure 22:
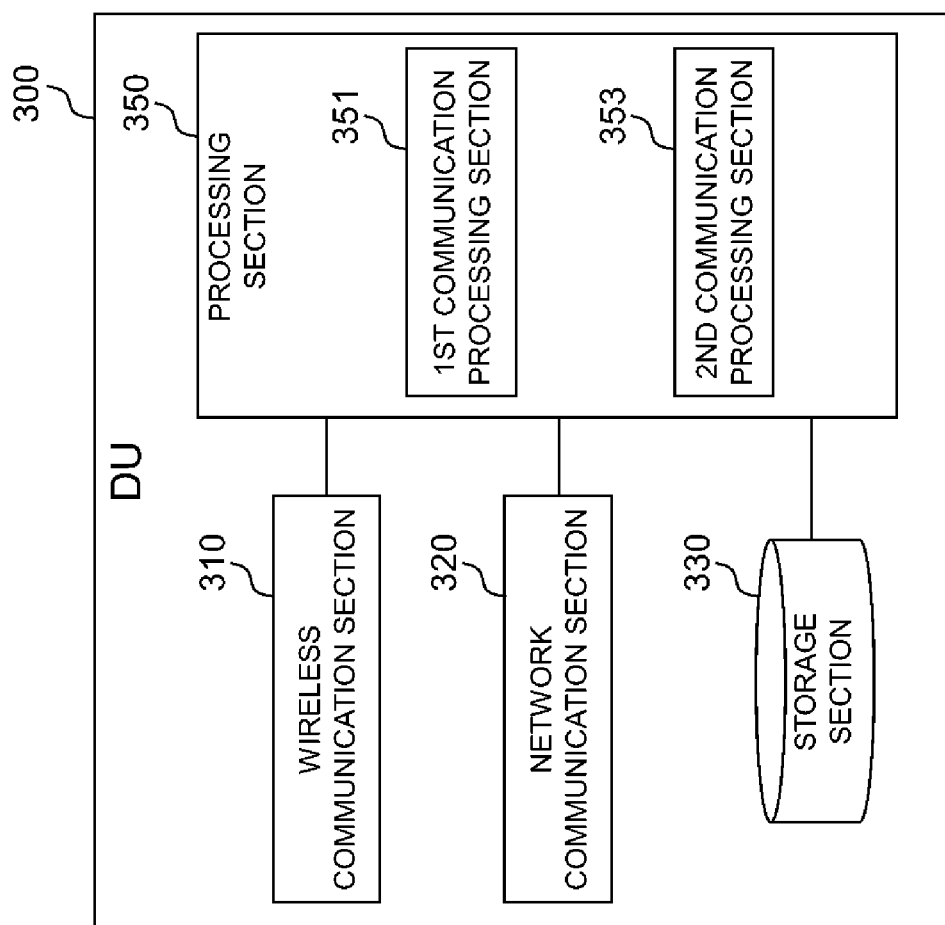
FIG. 22 is a block diagram illustrating an example of a schematic configuration of a DU according to the second example embodiment.

FIG. 22 is a block diagram illustrating an example of a schematic configuration of the DU 300 according to the second example embodiment. Referring to FIG. 22, the DU 300 includes a wireless communication section 310, a network communication section 320, a storage section 330 and a processing section 350.

There is no difference between the first and second example embodiments in descriptions for the wireless communication section 310, the network communication section 320 and the storage section 330. Hence, duplicate descriptions are herein omitted.

(1) Processing Section 350

The processing section 350 provides various functions of the DU 300. The processing section 350 includes a first communication processing section 351 and a second communication processing section 353. Note that the processing section 350 may further include another constituent element than these constituent elements. That is, the processing section 350 may perform operations other than the operations of these constituent elements.

For example, the processing section 350 (the first communication processing section 351) communicates with the terminal apparatus 500 via the wireless communication section 310. For example, the processing section 350 (the second communication processing section 353) communicates with the CU 200 (or the second base station 400) via the network communication section 320.

(2) Implementation Examples

The processing section 350 may be implemented with one or more processors such as Base Band (BB) processors, another type of processors and/or the like. The first communication processing section 351 and the second communication processing section 353 may be implemented with the same processor or with respective different processors. The memory (the storage section 330) may be included in the one or more processors or may be external to the one or more processors.

The DU 300 may include a memory that stores programs (instructions) and one or more processors that are capable of executing the programs (instructions). The one or more processors may execute the programs to perform operations of the processing section 350 (operations of the first communication processing section 351 and/or the second communication processing section 353). The programs may be programs for causing a processor to execute the operations of the processing section 350 (operations of the first communication processing section 351 and/or the second communication processing section 353).

Note that the DU 300 may be virtualized. That is, the DU 300 may be implemented as a virtual machine. In this case, the DU 300 (virtual machine) may operate as a virtual machine on a physical machine (hardware) including a processor, memory and the like and on a hypervisor.

3.3. Technical Features

Next, with reference to FIG. 23, examples of technical features of the second example embodiment will be described.

(1) Counting Amount of Data

For example, the first base station 100 operates, for the terminal apparatus 500, as a secondary node (SN) of dual connectivity which uses at least NR. In this case, the first base station 100 counts an amount of data transported between the first base station 100 and the terminal apparatus 500 at RLC layer or MAC layer.

Among others, in the second example embodiment, as described above, the CU 200 performs processing of RLC layer and MAC layer and, thus, the CU 200 (the count section 255) counts the amount of data at RLC layer or MAC layer.

Note that the term "count" may be interchanged with a term "measure".

RLC/MAC

Specifically, for example, the CU 200 (the count section 255) counts an amount of RLC or MAC packet data. For example, such packets may be service data units (SDU) of RLC or MAC. Alternatively, such packets may be protocol data units (PDU) of RLC or MAC.

Counted Data

There is no difference between the first and second example embodiments in descriptions for counted data. Hence, duplicate descriptions are herein omitted.

Bearer/QoS Flow

For example, counting the amount of data is done per bearer basis. The bearer herein may be a radio bearer (RB) (for example, data radio bearer (DRB)) or may be a radio access bearer (RAB). Alternatively, counting the amount of data may be done per QoS flow basis.

This, for example, makes it possible for the SN to count the amount of data independently of bearers even if there is a complicated data processing route due to various bearers. Thus, the SN can report the amount of data to the MN.

(2) Transmitting Data Amount Information by CU

For example, the CU 200 (the second communication processing section 253) transmits, to the second base station 400 (MN), data amount information that indicates the (counted) amount of the data.

For example, the CU 200 (the second communication processing section 253) transmits, to the second base station 400 (MN), a message including the data amount information.

For example, the dual connectivity is EN-DC, the interface 50 between the first base station 100 and the second base station 400 is an X2 interface and the above message is an X2 message. More specifically, for example, the message is a Secondary RAT Data Usage Report message.

For example, there is no difference between the first and second example embodiments in descriptions for contents of the SECONDARY RAT DATA USAGE REPORT message (FIGS. 15 and 16). Hence, duplicate descriptions are herein omitted.

As also illustrated in FIG. 16, for example, the data amount information includes information per bearer (information indicative of amount of data per bearer basis). The bearer herein may be a radio bearer (RB) (for example, data radio bearer (DRB)) or may be a radio access bearer (RAB) (for example, E-RAB). Alternatively, the data amount information may include information per QoS flow (information indicative of amount of data per QoS flow basis).

(3) Transmitting Data Amount Information by Second Base Station

For example, the second base station 400 (the first communication processing section 441) receives, from the first base station 100 (the CU 200), the message including the data amount information.

For example, the second base station 400 (the second communication processing section 443) further transmits, to the core network 10, a message for which the data amount information is used.

For example, the message transmitted to the core network 10 includes the data amount information. Alternatively, the message transmitted to the core network 10 may include some other data amount information (for example, information of aggregated amount of data) generated (by the second base station 400) on the basis of the data amount information.

For example, the dual connectivity is EN-DC, the interface 40 between the second base station 400 and the core network 10 is an S1 interface and the above message is an S1 message. More specifically, for example, the message is a SECONDARY RAT REPORT message and includes Usage count UL IE and Usage count DL IE (that is, the counted amount of data).

(4) Process Flow

Figure 23:
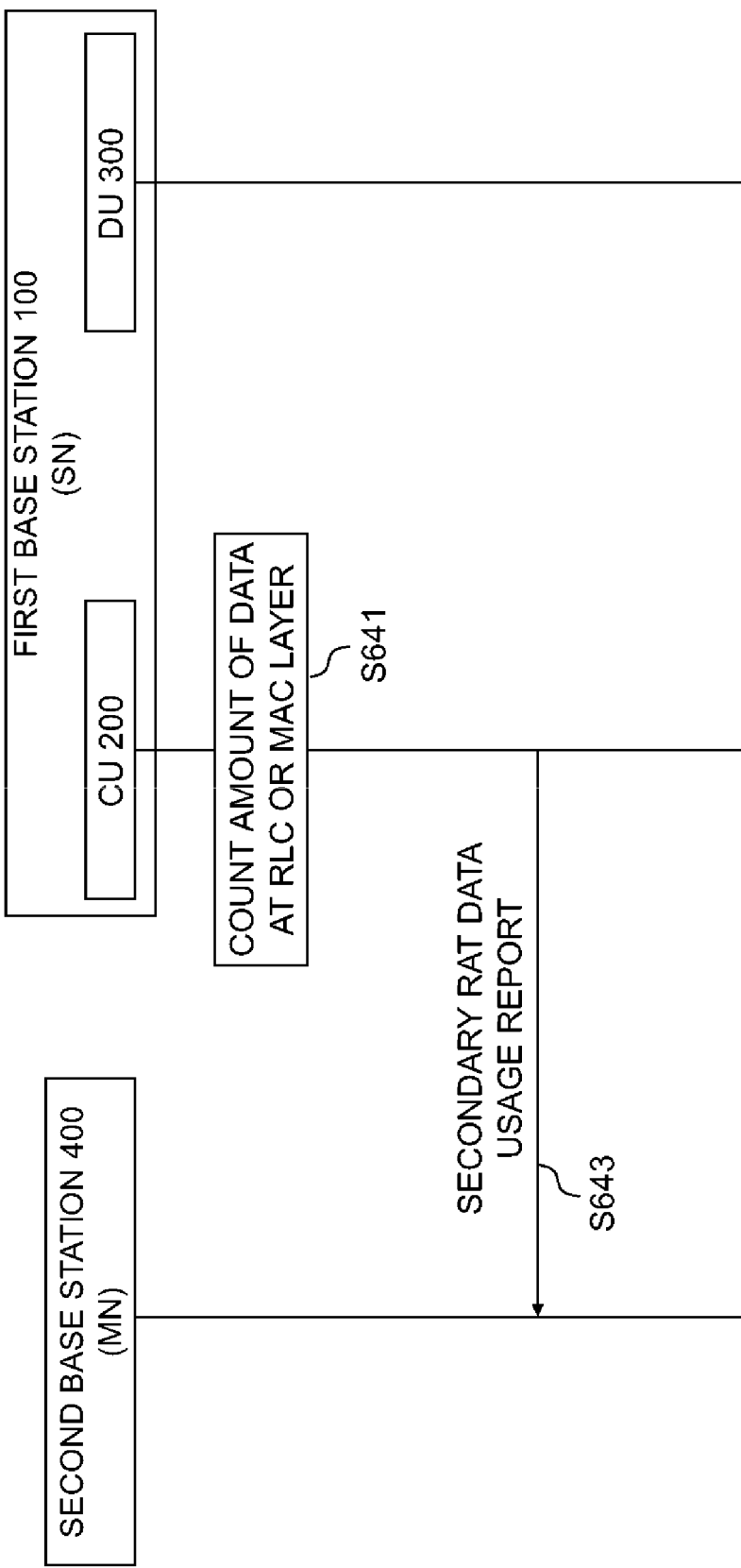
FIG. 23 is a sequence diagram for describing an example of a schematic flow of a process according to the second example embodiment.

FIG. 23 is a sequence diagram for describing an example of a schematic flow of a process according to the second example embodiment.

The CU 200 counts an amount of data transported between the first base station 100 (SN) and the terminal apparatus 500 at RLC layer or MAC layer (S641).

The CU 200 transmits, to the second base station 400, a SECONDARY RAT DATA USAGE REPORT message including data amount information that indicates the counted amount of the data (Usage count UL IE and Usage count DL IE) (S643).

Note that the second base station 400 may further transmits, to the core network 10, a SECONDARY RAT REPORT message for which the data amount information is used (a SECONDARY RAT REPORT message including Usage count UL IE and Usage count DL IE).

3.4. Example Alterations

Next, with reference to FIG. 24, example alterations of the second example embodiment will be described. In the following, differences between the above-described examples in the second example embodiment and each example alteration will be described.

(1) Transmitting Data Amount Information by CU

In the above-described example of the second example embodiment, the CU 200 (the second communication processing section 243) transmits a message (a control plane message) including the data amount information to the second base station 400 (MN). However, the second example embodiment is not limited to such an example.

Among others, in an example alteration of the second example embodiment, the CU 200 (the second communication processing section 243) transmits a user plane frame including the data amount information to the second base station 400 (MN).

Specifically, for example, the CU 200 (the second communication processing section 243) transmits, to the second base station 400 (MN), a user plane frame including first data amount information indicative of an amount of first data transported between the first base station 100 and the terminal apparatus 500 through at least one radio bearer terminated at the secondary node (SN) (the first base station 100) of the dual connectivity. For example, the at least one radio bearer terminated at the SN (the first base station 100) includes SN Terminated bearers. For example, the first data is data transported between the first base station 100 and the terminal apparatus 500 through a Split bearer and an SCG bearer out of the SN Terminated bearers.

Moreover, for example, the CU 200 (the second communication processing section 243) transmits, to the second base station 400 (MN), a user plane frame including second data amount information indicative of an amount of second data transported between the first base station 100 and the terminal apparatus 500 through at least one radio bearer terminated at the master node (MN) (the second base station 400) of the dual connectivity. For example, the at least one radio bearer terminated at the MN (the second base station 400) includes MN Terminated bearers. For example, the second data is data transported between the first base station 100 and the terminal apparatus 500 through a Split bearer and an SCG bearer out of the MN Terminated bearers.

For example, the user plane frame is a GTP-U frame. Specifically, for example, the user plane frame is a DL DATA DELIVERY STATUS frame.

For example, there is no difference between the first and second example embodiments in descriptions for contents of the DL DATA DELIVERY STATUS frame (FIG. 18). Hence, duplicate descriptions are herein omitted.

(2) Transmitting Data Amount Information by Second Base Station

For example, the second base station 400 (the first communication processing section 441) receives, from the first base station 100 (the CU 200), the message including the first data amount information. The second base station 400 (the first communication processing section 441) receives, from the first base station 100 (the CU 200), a user plane frame including the second data amount information.

For example, the second base station 400 (the second communication processing section 443) further transmits, to the core network 10, a message for which the first and second data amount information is used.

For example, the message transmitted to the core network 10 includes the first and second data amount information. Alternatively, the message transmitted to the core network 10 may include some other data amount information (for example, information of aggregated amount of data) generated (by the second base station 400) on the basis of the first and second data amount information.

(3) Process Flow

Figure 24:
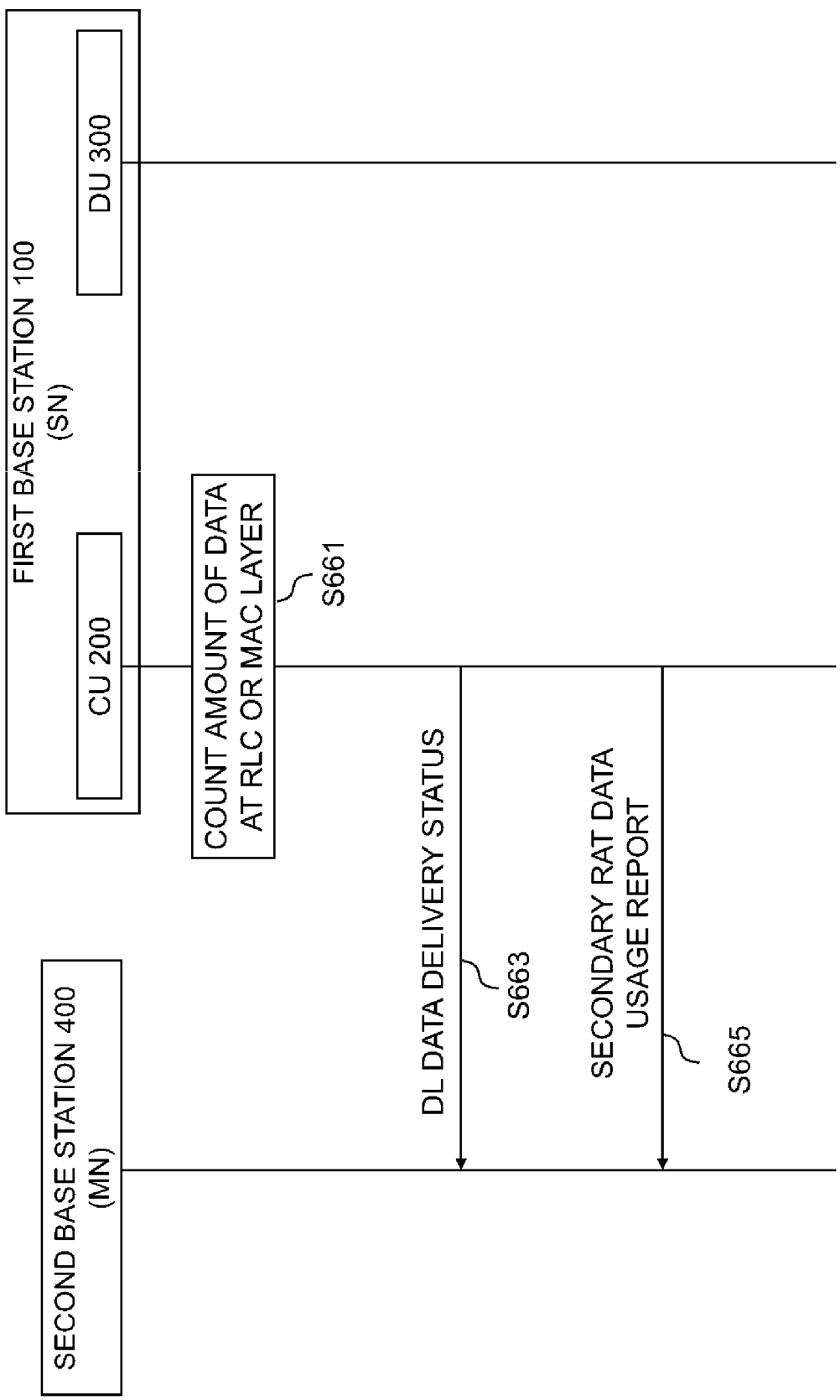
FIG. 24 is a sequence diagram for describing an example of a schematic flow of a process according to the example alteration of the second example embodiment.

FIG. 24 is a sequence diagram for describing an example of a schematic flow of a process according to the example alteration of the second example embodiment.

The CU 200 counts an amount of data transported between the first base station 100 (SN) and the terminal apparatus 500 at RLC layer or MAC layer (S661). Specifically, the CU 200 counts an amount of first data transported between the first base station 100 (SN) and the terminal apparatus 500 through SN Terminated bearers and count an amount of second data transported between the first base station 100 (SN) and the terminal apparatus 500 through MN Terminated bearers.

The CU 200 transmits, to the second base station 400, a DL DATA DELIVERY STATUS frame including second data amount information that indicates the counted amount of the second data (Usage count UL and Usage count DL) (S663).

The CU 200 transmits, to the second base station 400, a SECONDARY RAT DATA USAGE REPORT message including the first data amount information that indicates the counted amount of the first data (Usage count UL IE and Usage count DL IE) (S665).

Note that the second base station 400 may further transmits, to the core network 10, a SECONDARY RAT REPORT message for which the first and second data amount information is used (a SECONDARY RAT REPORT message including Usage count UL IE and Usage count DL IE).

4. Third Example Embodiment

Next, the third example embodiment of the present invention will be described with reference to FIGS. 25 to 32.

4.1. Splitting First Base Station

First, splitting the first base station 100 according to the third example embodiment will be described with reference to FIGS. 25 and 26.

Figure 25:
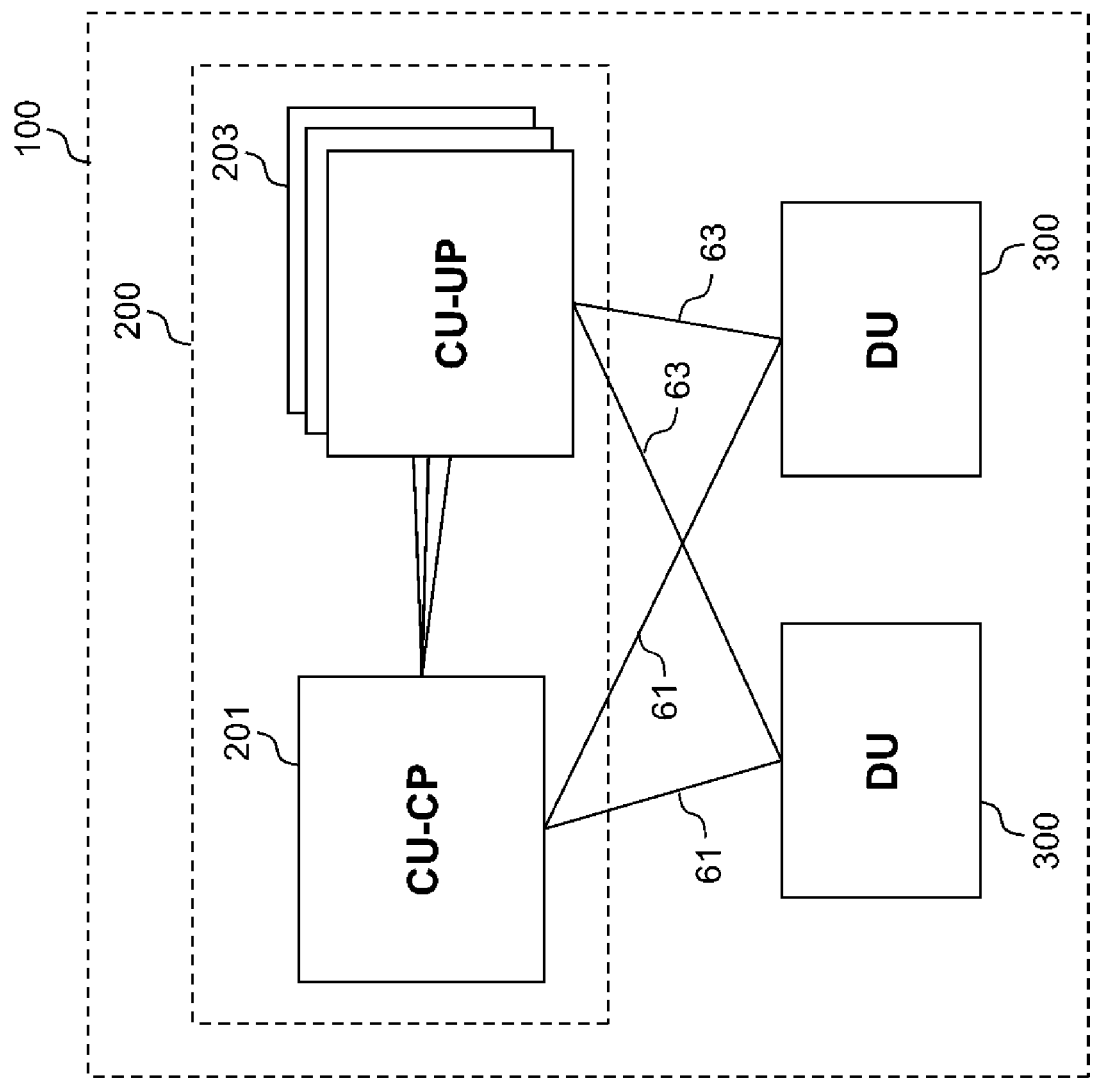
FIG. 25 is an explanatory diagram for describing an example of splitting a first base station according to a third example embodiment.

FIG. 25 is an explanatory diagram for describing an example of splitting the first base station 100 according to the third example embodiment. Referring to FIG. 25, the first base station 100 includes a central unit (CU) 200 and distributed units (DUs) 300. Further, in the third example embodiment, the CU 200 includes a CU-CP 201 which is a first central unit for a control plane and a CU-UP 203 which is a second central unit for a user plane. There may exist a plurality of CU-UPs 203 per a single CU-CP 201. Each DU 300 communicates with the CU-CP 201 via an interface 61 and with the CU-UP 203 via an interface 63.

For example, the CU 200 performs processing of the PDCP layer and the DU 300 performs processing of RLC and MAC layers. That is, the first base station 100 is split by Higher Layer Split.

Figure 26:
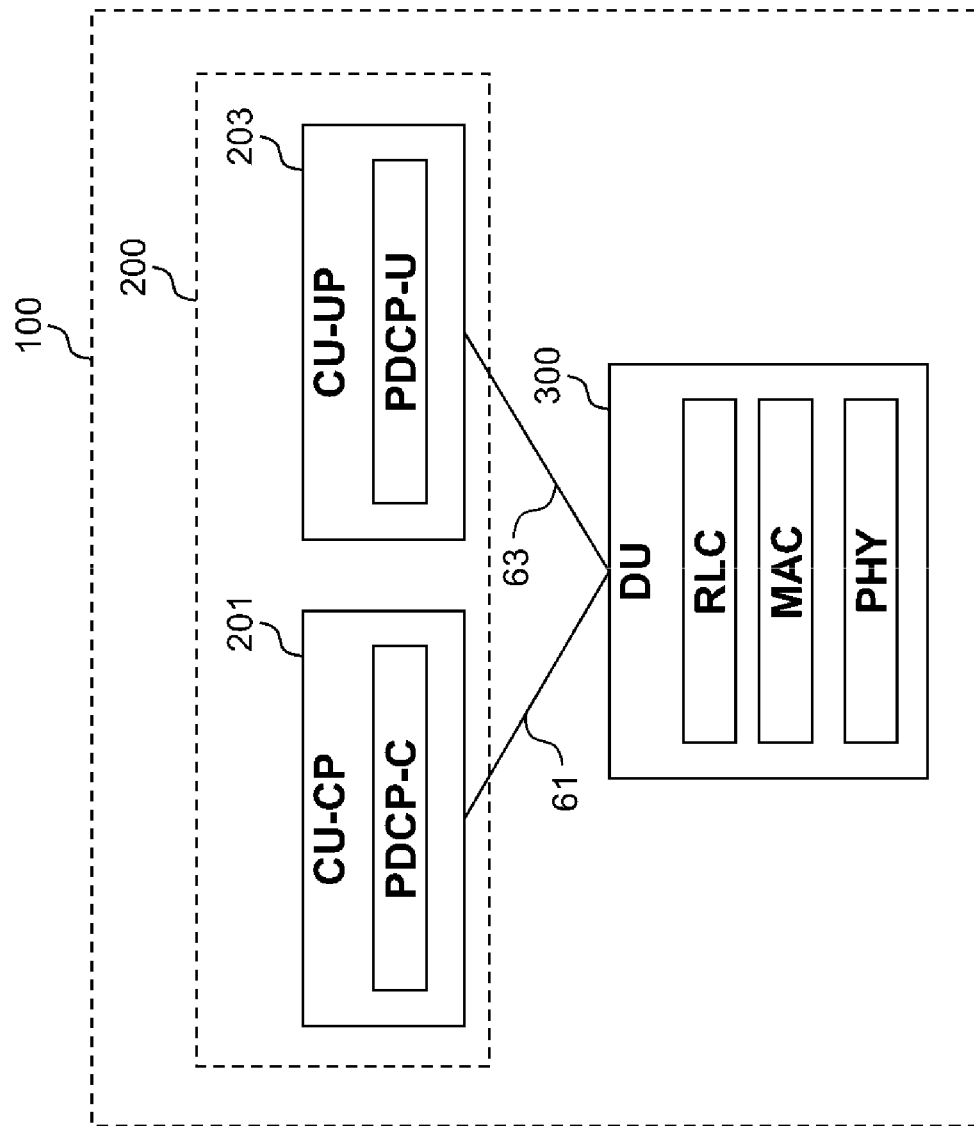
FIG. 26 is an explanatory diagram for describing an example of splitting a first base station (higher layer split) according to a third example embodiment.

FIG. 26 is an explanatory diagram for describing an example of splitting the first base station 100 (higher layer split) according to the third example embodiment. Referring to FIG. 26, the CU 200 and the DU 300 included in the first base station 100 are shown. The PDCP layer is located at the CU 200 and the RLC, MAC and physical (PHY) layers are located at the DU 300. That is, the CU 200 performs processing of the PDCP layer and the DU 300 performs processing of the RLC, MAC and PHY layers. Further, the control plane in the PDCP layer is located at the CU-CP 201 and the user plane in the PDCP layer is located at the CU-UP 203. In this case, the interface 61 is an F1-C interface and the interface 63 is an F1-U interface.

Alternatively, in the third example embodiment, the CU 200 may perform processing of PDCP layer and processing of RLC and MAC layers. That is, the first base station 100 may be split by Lower Layer Split.

4.2. Configuration of Each Node

Next, a configuration of each node will be described with reference to FIGS. 27 and 28.

Note that the configuration of the DU 300 according to the third example embodiment is, for example, the same as the configuration of the DU 300 according to the first or second example embodiment. The configurations of the second base station 400 and the terminal apparatus 500 according to the third example embodiment are also, for example, the same as the configurations of the second base station 400 and the terminal apparatus 500 according to the first (or second) example embodiment. Hence, duplicate descriptions are herein omitted.

4.2.1. Configuration of CU-CP

Figure 27:
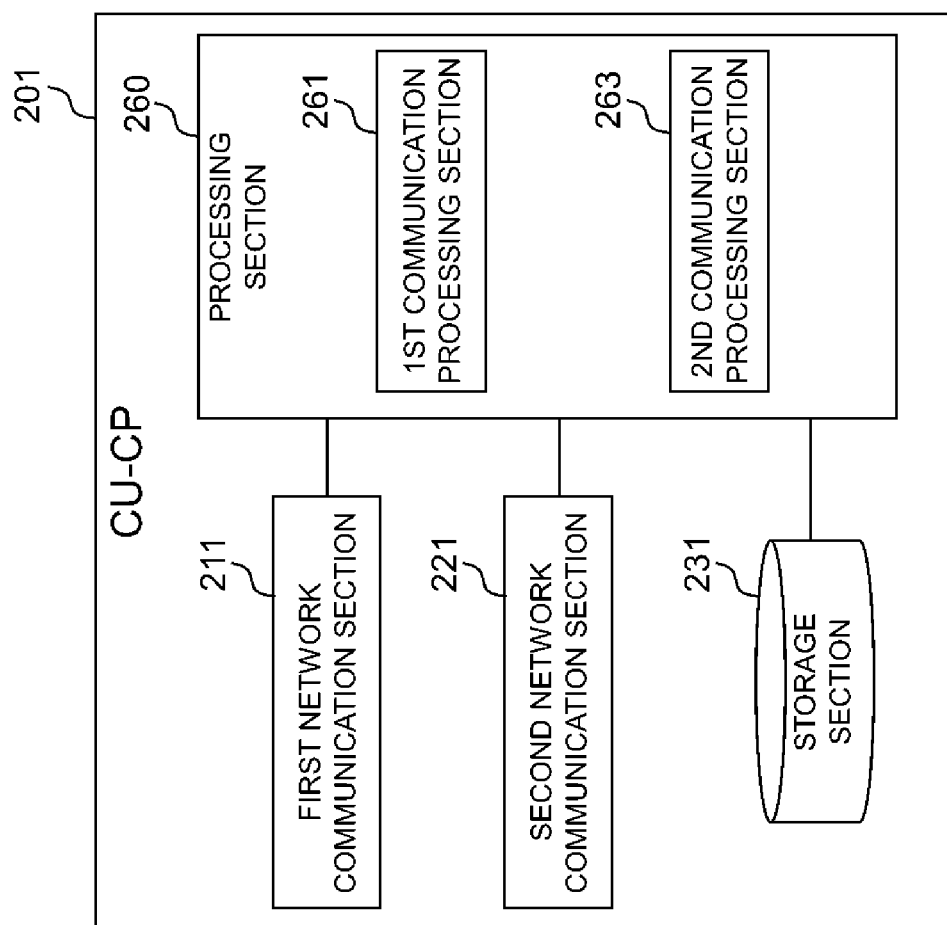
FIG. 27 is a block diagram illustrating an example of a schematic configuration of a CU-CP according to the third example embodiment.

FIG. 27 is a block diagram illustrating an example of a schematic configuration of the CU-CP 201 according to the third example embodiment. Referring to FIG. 27, the CU-CP 201 includes a first network communication section 211, a second network communication section 221, a storage section 231 and a processing section 260.

(1) First Network Communication Section 211

The first network communication section 211 receives a signal from the CU-UP 203 and transmits a signal to the CU-UP 203.

The first network communication section 211 may receive a signal from the DU 300 and transmit a signal to the DU 300.

(2) Second Network Communication Section 221

The second network communication section 221 receives a signal from the second base station 400 and transmits a signal to the second base station 400.

The second network communication section 221 may receive a signal from the core network 10 and transmit a signal to the core network 10.

(3) Storage Section 231

The storage section 231 stores a program (instructions) and parameters for operation of the CU-CP 201 as well as various data temporarily or permanently. The program includes one or more instructions for operation of the CU-CP 201.

(4) Processing Section 260

The processing section 260 provides various functions of the CU-CP 201. The processing section 260 includes a first communication processing section 261 and a second communication processing section 263. Note that the processing section 260 may further include another constituent element than these constituent elements. That is, the processing section 260 may perform operations other than the operations of these constituent elements.

For example, the processing section 260 (the first communication processing section 261) communicates with the CU-UP 203 (or the DU 300) via the first network communication section 211. For example, the processing section 260 (the second communication processing section 263) communicates with the second base station 400 (or the core network 10) via the second network communication section 221.

(5) Implementation Examples

Each of the first network communication section 211 and the second network communication section 221 may be implemented with a network adapter, a network interface card and/or the like. The storage section 231 may be implemented with a memory (for example, a non-volatile memory and/or a volatile memory), hard disc and/or the like. The processing section 260 may be implemented with one or more processors such as Base Band (BB) processors, another type of processors and/or the like. The first communication processing section 261 and the second communication processing section 263 may be implemented with the same processor or with respective different processors. The above memory (the storage section 231) may be included in the one or more processors or may be external to the one or more processors.

The CU-CP 201 may include a memory that stores programs (instructions) and one or more processors that are capable of executing the programs (instructions). The one or more processors may execute the programs to perform operations of the processing section 260 (operations of the first communication processing section 261 and/or the second communication processing section 263). The programs may be programs for causing a processor to execute the operations of the processing section 260 (operations of the first communication processing section 261 and/or the second communication processing section 263).

Note that the CU-CP 201 may be virtualized. That is, the CU-CP 201 may be implemented as a virtual machine. In this case, the CU-CP 201 (virtual machine) may operate as a virtual machine on a physical machine (hardware) including a processor, memory and the like and on a hypervisor.

4.2.2. Configuration of CU-CP

Figure 28:
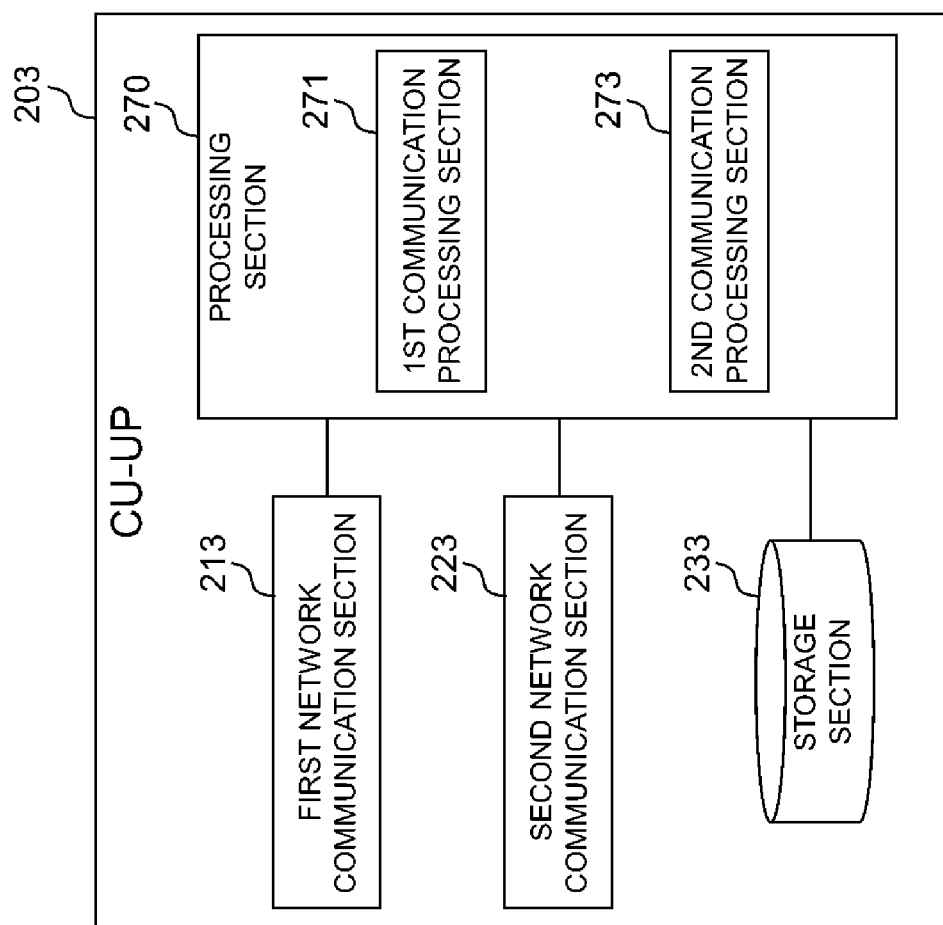
FIG. 28 is a block diagram illustrating an example of a schematic configuration of a CU-UP according to the third example embodiment.

FIG. 28 is a block diagram illustrating an example of a schematic configuration of the CU-UP 203 according to the third example embodiment. Referring to FIG. 28, the CU-UP 203 includes a first network communication section 213, a second network communication section 223, a storage section 233 and a processing section 270.

(1) First Network Communication Section 213

The first network communication section 213 receives a signal from the CU-CP 201 and transmits a signal to the CU-CP 201.

The first network communication section 213 may receive a signal from the DU 300 and transmit a signal to the DU 300.

(2) Second Network Communication Section 223

The second network communication section 223 receives a signal from the second base station 400 and transmits a signal to the second base station 400.

The second network communication section 223 may receive a signal from the core network 10 and transmit a signal to the core network 10.

(3) Storage Section 233

The storage section 233 stores a program (instructions) and parameters for operation of the CU-UP 203 as well as various data temporarily or permanently. The program includes one or more instructions for operation of the CU-UP 203.

(4) Processing Section 270

The processing section 270 provides various functions of the CU-UP 203. The processing section 270 includes a first communication processing section 271 and a second communication processing section 273. Note that the processing section 270 may further include another constituent element than these constituent elements. That is, the processing section 270 may perform operations other than the operations of these constituent elements.

For example, the processing section 270 (the first communication processing section 271) communicates with the CU-CP 201 (or the DU 300) via the first network communication section 213. For example, the processing section 270 (the second communication processing section 273) communicates with the second base station 400 (or the core network 10) via the second network communication section 223.

(5) Implementation Examples

Each of the first network communication section 213 and the second network communication section 223 may be implemented with a network adapter, a network interface card and/or the like. The storage section 233 may be implemented with a memory (for example, a non-volatile memory and/or a volatile memory), hard disc and/or the like. The processing section 270 may be implemented with one or more processors such as Base Band (BB) processors, another type of processors and/or the like. The first communication processing section 271 and the second communication processing section 273 may be implemented with the same processor or with respective different processors. The above memory (the storage section 233) may be included in the one or more processors or may be external to the one or more processors.

The CU-UP 203 may include a memory that stores programs (instructions) and one or more processors that are capable of executing the programs (instructions). The one or more processors may execute the programs to perform operations of the processing section 270 (operations of the first communication processing section 271 and/or the second communication processing section 273). The programs may be programs for causing a processor to execute the operations of the processing section 270 (operations of the first communication processing section 271 and/or the second communication processing section 273).

Note that the CU-UP 203 may be virtualized. That is, the CU-UP 203 may be implemented as a virtual machine. In this case, the CU-UP 203 (virtual machine) may operate as a virtual machine on a physical machine (hardware) including a processor, memory and the like and on a hypervisor.

4.3. Technical Features

Next, with reference to FIGS. 29 to 32, examples of technical features of the third example embodiment will be described.

The descriptions in the first and second example embodiments may be applied where appropriate in the third example embodiment. In the following, specific process flows will be described.

(1) Process Flow (First Example)

Figure 29:
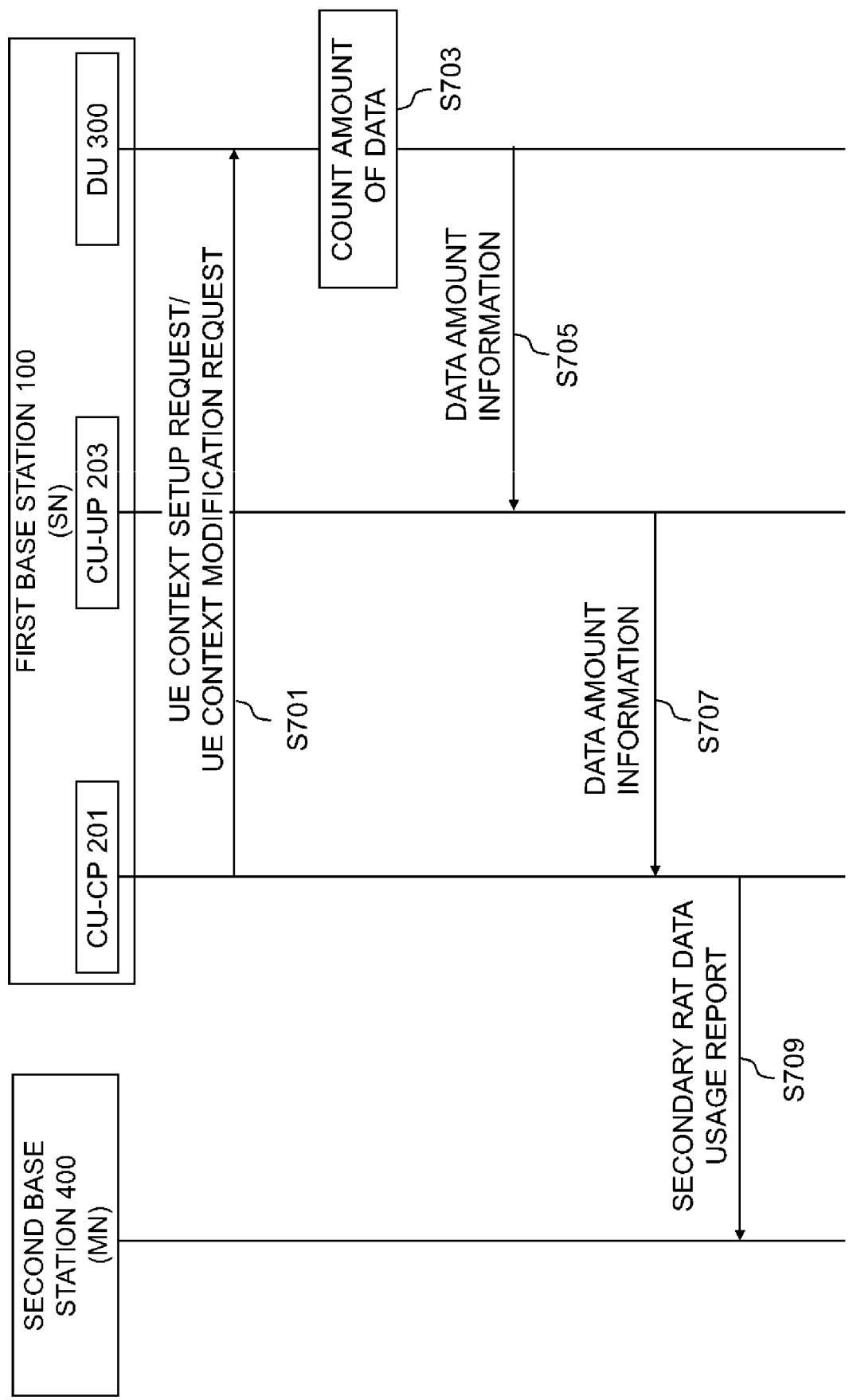
FIG. 29 is a sequence diagram for describing a first example of a schematic flow of a process according to the third example embodiment.

FIG. 29 is a sequence diagram for describing a first example of a schematic flow of a process according to the third example embodiment.

The CU-CP 201 (the first communication processing section 261) transmits, to the DU 300, a UE CONTEXT SETUP REQUEST message or a UE CONTEXT MODIFICATION REQUEST message including Data Usage report Indication IE (instruction for transmission of data amount information) (S701).

The DU 300 (the count section 345) counts an amount of data transported between the first base station 100 (SN) and the terminal apparatus 500 (S703). For example, the DU 300 counts the amount of the data at RLC layer or MAC layer. For example, the DU 300 (the count section 345) counts an amount of first data transported through SN Terminated bearers and an amount of second data transported through MN Terminated bearers.

The DU 300 (the second communication processing section 343) transmits data amount information that indicates the counted amount of data to the CU-UP 203 (S705). For example, the DU 300 transmits a user plane frame including the data amount information to the CU-UP 203.

The CU-UP 203 (the first communication processing section 271) transmits the data amount information to the CU-CP 201 (S707).

The CU-CP 201 (the second communication processing section 263) transmits, to the second base station 400, a SECONDARY RAT DATA USAGE REPORT message for which the data amount information is used (a SECONDARY RAT DATA USAGE REPORT message including Usage count UL IE and Usage count DL IE) (S709).

Note that the second base station 400 may further transmits, to the core network 10, a SECONDARY RAT REPORT message for which the data amount information is used (a SECONDARY RAT REPORT message including Usage count UL IE and Usage count DL IE).

The step S701 may be omitted from among the above-described process steps. That is, as mentioned above, the DU 300 may not receive an instruction from the CU 200 (an instruction for transmission of data amount information) (Data Usage report Indication IE) and may transmit the data amount information without such an instruction from the CU 200 (see the first and second example embodiments).

(2) Process Flow (Second Example)

Figure 30:
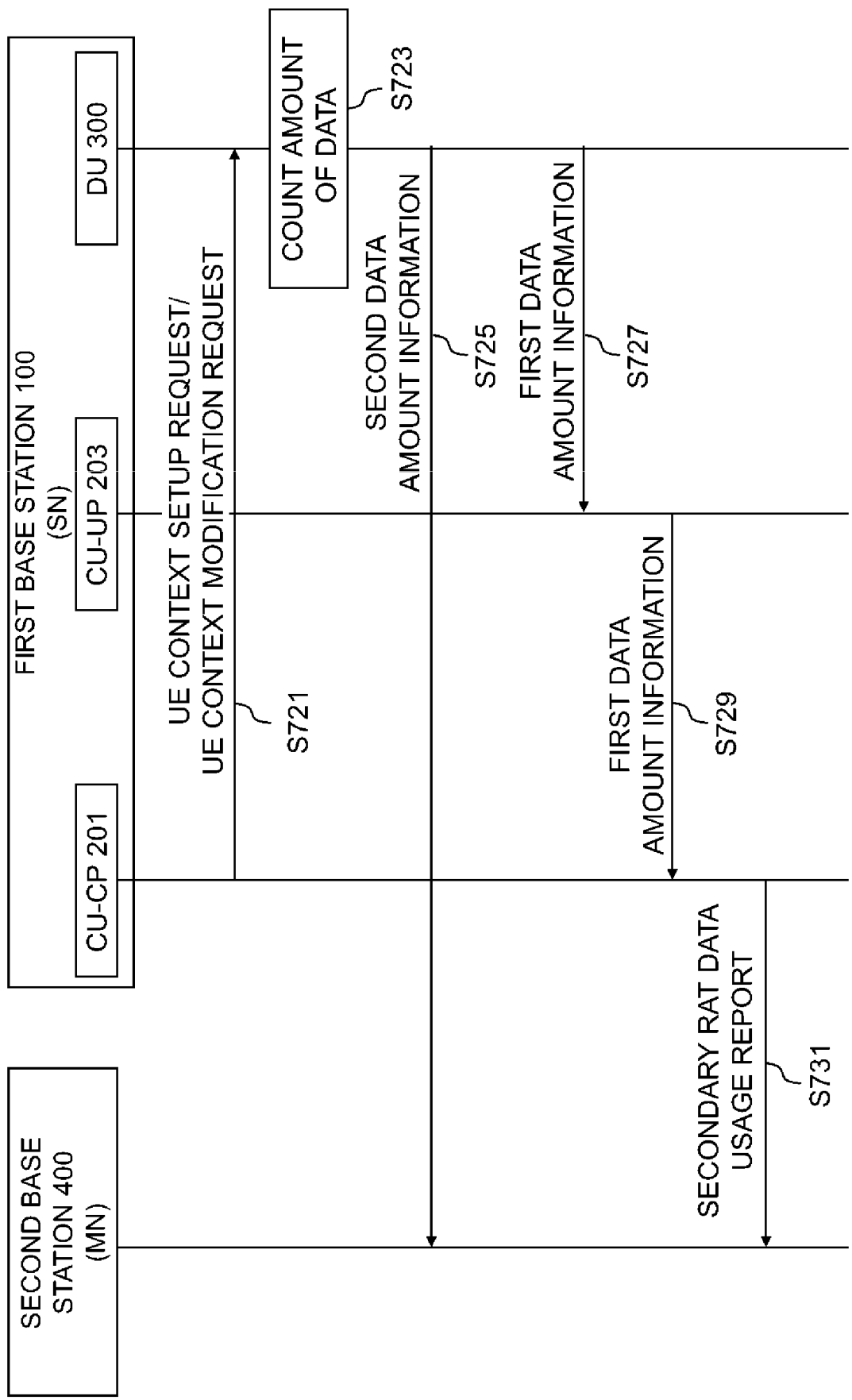
FIG. 30 is a sequence diagram for describing a second example of a schematic flow of a process according to the third example embodiment.

FIG. 30 is a sequence diagram for describing a second example of a schematic flow of a process according to the third example embodiment.

The CU-CP 201 (the first communication processing section 261) transmits, to the DU 300, a UE CONTEXT SETUP REQUEST message or a UE CONTEXT MODIFICATION REQUEST message including Data Usage report Indication IE (instruction for transmission of data amount information) (S721).

The DU 300 (the count section 345) counts an amount of data transported between the first base station 100 (SN) and the terminal apparatus 500 (S723). For example, the DU 300 counts the amount of the data at RLC layer or MAC layer. For example, the DU 300 (the count section 345) counts an amount of first data transported through SN Terminated bearers and count an amount of second data transported through MN Terminated bearers.

The DU 300 (the second communication processing section 343) transmits, to the second base station 400 (MN), second data amount information that indicates the counted amount of the second data (S725). For example, the DU 300 transmits a user plane frame including the second data amount information to the second base station 400.

The DU 300 (the second communication processing section 343) transmits, to the CU-UP 203, first data amount information that indicates the counted amount of the first data (S727). For example, the DU 300 transmits a user plane frame including the first data amount information to CU-UP 203.

The CU-UP 203 (the first communication processing section 271) transmits the first data amount information to the CU-CP 201 (S729).

The CU-CP 201 (the second communication processing section 263) transmits, to the second base station 400, a SECONDARY RAT DATA USAGE REPORT message for which the first data amount information is used (a SECONDARY RAT DATA USAGE REPORT message including Usage count UL IE and Usage count DL IE) (S731).

Note that the second base station 400 may further transmits, to the core network 10, a SECONDARY RAT REPORT message for which the first and second data amount information is used (a SECONDARY RAT REPORT message including Usage count UL IE and Usage count DL IE).

The step S721 may be omitted from among the above-described process steps. That is, as mentioned above, the DU 300 may not receive an instruction from the CU 200 (an instruction for transmission of data amount information) (Data Usage report Indication IE) and may transmit the data amount information without such an instruction from the CU 200 (see the first and second example embodiments).

(3) Process Flow (Third Example)

Figure 31:
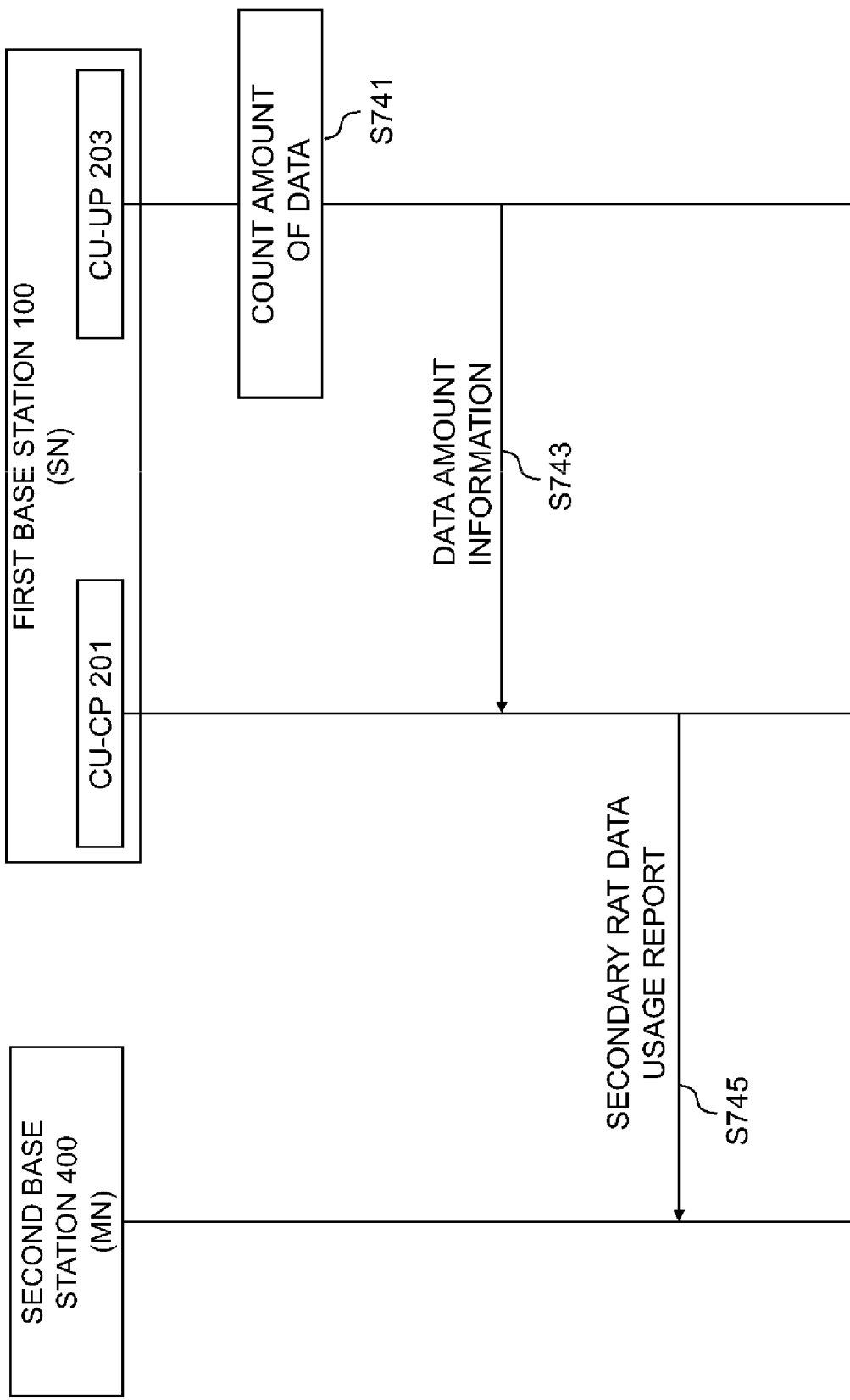
FIG. 31 is a sequence diagram for describing a third example of a schematic flow of a process according to the third example embodiment.

FIG. 31 is a sequence diagram for describing a third example of a schematic flow of a process according to the third example embodiment.

In this case, the processing section 270 of the CU-UP 203 further includes a count section 275 (a measurement section 275).

The CU-UP 203 (the count section 275) counts an amount of data transported between the first base station 100 (SN) and the terminal apparatus 500 (S741). For example, the CU-UP 203 (the count section 275) counts an amount of first data transported through SN Terminated bearers. The CU-UP 203 (the count section 275) may count an amount of second data transported through MN Terminated bearers. For example, the CU-UP 203 (the count section 275) counts the amount of the first data (and the amount of the second data) between PDCP layer and RLC layer. Alternatively, the CU-UP 203 (the count section 275) may count the amount of the first data (and the amount of the second data) at RLC or MAC layer (in the case of Lower Layer Split).

The CU-UP 203 (the first communication processing section 271) transmits data amount information indicative of the counted amount of data to the CU-CP 201 (S743).

The CU-CP 201 (the second communication processing section 263) transmits, to the second base station 400, a SECONDARY RAT DATA USAGE REPORT message for which the data amount information is used (a SECONDARY RAT DATA USAGE REPORT message including Usage count UL IE and Usage count DL IE) (S745).

Note that the second base station 400 may further transmits, to the core network 10, a SECONDARY RAT REPORT message for which the data amount information is used (a SECONDARY RAT REPORT message including Usage count UL IE and Usage count DL IE).

The CU-UP 203 may transmit the data amount information to the CU-CP 201 in response to an instruction from the CU-CP 201 (an instruction for transmission of data amount information). Alternatively, the CU-UP 203 may transmit the data amount information to the CU-CP 201 without an instruction from the CU-CP 201. In this case, an OAM may configure such as whether transmission of the data amount information (that is, data amount reporting) is to be done or not and a timing when to transmit the data amount information (that is, when to report the amount of data).

(4) Process Flow (Fourth Example)

Figure 32:
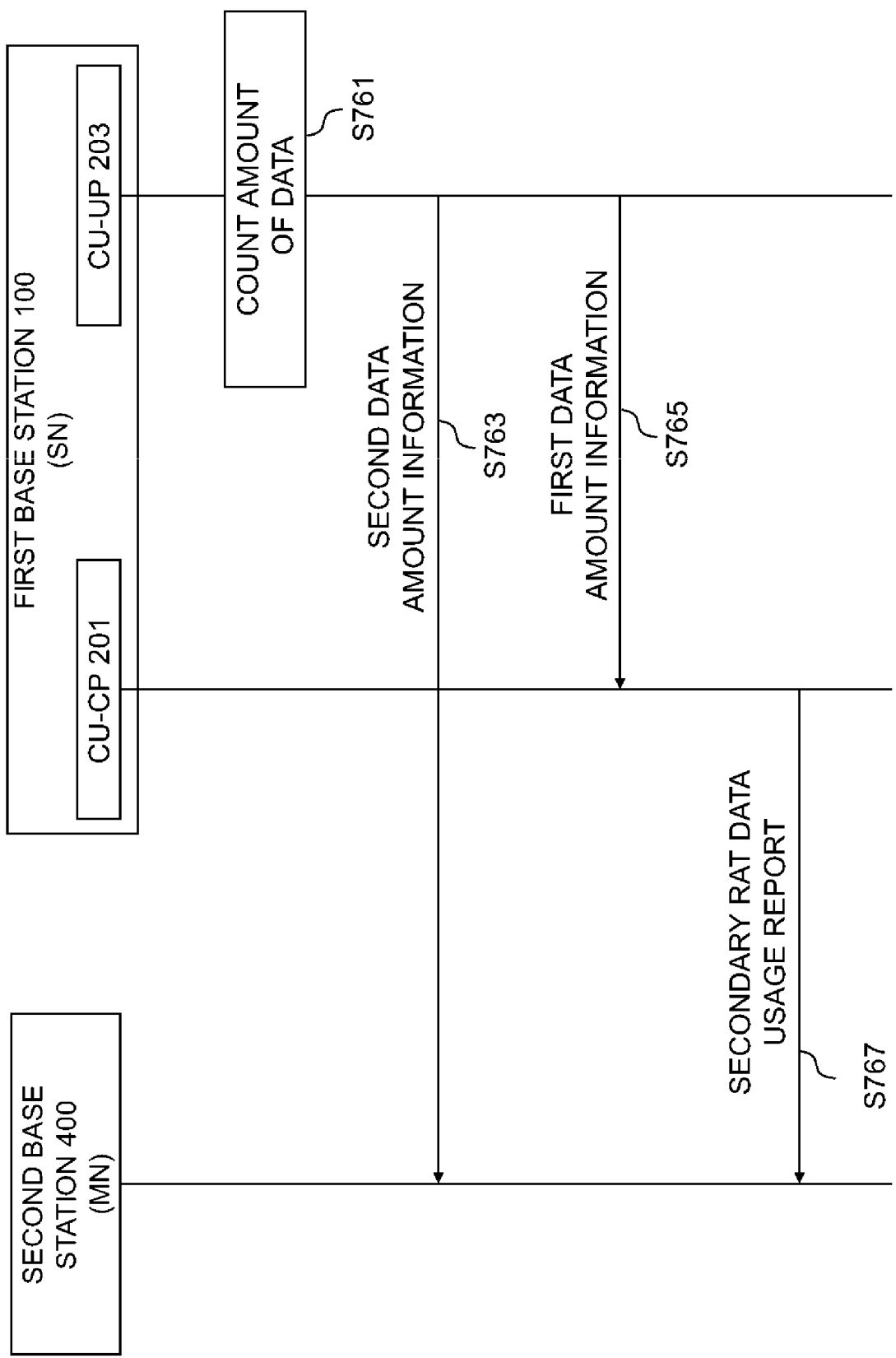
FIG. 32 is a sequence diagram for describing a fourth example of a schematic flow of a process according to the third example embodiment.

FIG. 32 is a sequence diagram for describing a fourth example of a schematic flow of a process according to the third example embodiment.

In this case, the processing section 270 of the CU-UP 203 further includes a count section 275 (a measurement section 275).

The CU-UP 203 (the count section 275) counts an amount of data transported between the first base station 100 (SN) and the terminal apparatus 500 (S761). For example, the CU-UP 203 (the count section 275) counts an amount of first data transported through SN Terminated bearers and an amount of second data transported through MN Terminated bearers. For example, the CU-UP 203 (the count section 275) counts the amount of the first data and the amount of the second data between PDCP layer and RLC layer. Alternatively, the CU-UP 203 (the count section 275) may count the amount of the first data and the amount of the second data at RLC or MAC layer (in the case of Lower Layer Split).

The CU-UP 203 (the second communication processing section 273) transmits second data amount information indicative of the counted amount of the second data to the second base station 400 (MN) (S763). For example, the CU-UP 203 transmits a user plane frame including the second data amount information to the second base station 400.

The CU-UP 203 (the first communication processing section 271) transmits first data amount information indicative of the counted amount of the first data to the CU-CP 201 (S765).

The CU-CP 201 (the second communication processing section 263) transmits, to the second base station 400, a SECONDARY RAT DATA USAGE REPORT message for which the first data amount information is used (a SECONDARY RAT DATA USAGE REPORT message including Usage count UL IE and Usage count DL IE) (S767).

Note that the second base station 400 may further transmits, to the core network 10, a SECONDARY RAT REPORT message for which the first and second data amount information is used (a SECONDARY RAT REPORT message including Usage count UL IE and Usage count DL IE).

The CU-UP 203 may transmit the data amount information in response to an instruction from the CU-CP 201 (an instruction for transmission of data amount information). Alternatively, the CU-UP 203 may transmit the data amount information without an instruction from the CU-CP 201. In this case, an OAM may configure such as whether transmission of the data amount information (that is, data amount reporting) is to be done or not and a timing when to transmit the data amount information (that is, when to report the amount of data).

5. Fourth Example Embodiment

Next, the fourth example embodiment of the present invention will be described with reference to FIGS. 33 to 35. The foregoing first, second and third example embodiments are concrete embodiments whereas the fourth example embodiment is a more generalized embodiment.

5.1. Configuration of Each Node

First, a configuration of each node will be described with reference to FIGS. 33 to 35.

5.1.1. Configuration of First Communication Apparatus

Figure 33:
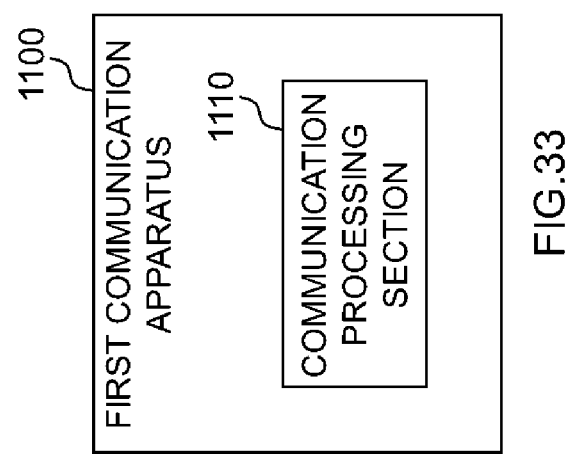
FIG. 33 is a block diagram illustrating an example of a schematic configuration of a first communication apparatus according to the fourth example embodiment.

FIG. 33 is a block diagram illustrating an example of a schematic configuration of a first communication apparatus 1100 according to the fourth example embodiment. Referring to FIG. 33, the first communication apparatus 1100 includes a communication processing section 1110. Specific actions of the communication processing section 1110 will be described later.

The communication processing section 1110 may be implemented with one or more processors such as Base Band (BB) processors, another type of processors and/or the like and a memory (for example, a non-volatile memory and/or a volatile memory), hard disc and/or the like. The memory may be included in the one or more processors or may be external to the one or more processors.

The first communication apparatus 1100 may include a memory that stores programs (instructions) and one or more processors that are capable of executing the programs (instructions). The one or more processors may execute the programs to perform operations of the communication processing section 1110. The programs may be programs for causing a processor to execute the operations of the communication processing section 1110.

Note that the first communication apparatus 1100 may be virtualized. That is, the first communication apparatus 1100 may be implemented as a virtual machine. In this case, the first communication apparatus 1100 (virtual machine) may operate as a virtual machine on a physical machine (hardware) including a processor, memory and the like and on a hypervisor.

5.1.2. Configuration of Second Communication Apparatus

Figure 34:
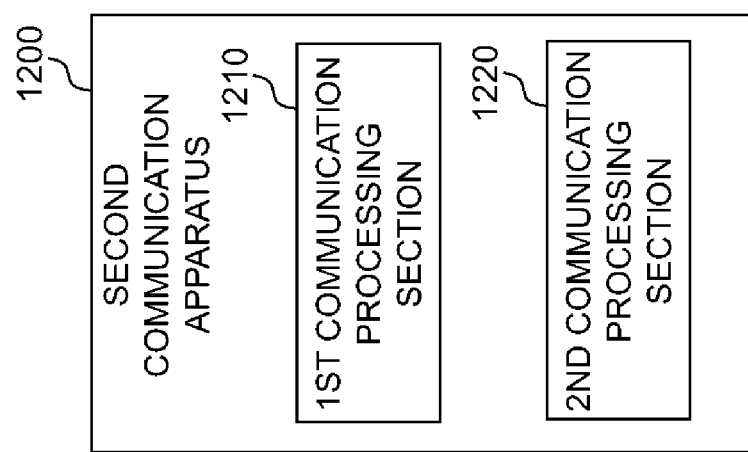
FIG. 34 is a block diagram illustrating an example of a schematic configuration of a second communication apparatus according to the fourth example embodiment.

FIG. 34 is a block diagram illustrating an example of a schematic configuration of a second communication apparatus 1200 according to the fourth example embodiment. Referring to FIG. 34, the second communication apparatus 1200 includes a first communication processing section 1210 and a second communication processing section 1220. Specific actions of the first communication processing section 1210 and the second communication processing section 1220 will be described later.

The first communication processing section 1210 and the second communication processing section 1220 may be implemented with one or more processors such as Base Band (BB) processors, another type of processors and/or the like and a memory (for example, a non-volatile memory and/or a volatile memory), hard disc and/or the like. The memory may be included in the one or more processors or may be external to the one or more processors.

The second communication apparatus 1200 may include a memory that stores programs (instructions) and one or more processors that are capable of executing the programs (instructions). The one or more processors may execute the programs to perform operations of the first communication processing section 1210 and/or the second communication processing section 1220. The programs may be programs for causing a processor to execute the operations of the first communication processing section 1210 and/or the second communication processing section 1220.

Note that the second communication apparatus 1200 may be virtualized. That is, the second communication apparatus 1200 may be implemented as a virtual machine. In this case, the second communication apparatus 1200 (virtual machine) may operate as a virtual machine on a physical machine (hardware) including a processor, memory and the like and on a hypervisor.

5.1.3. Configuration of Terminal Apparatus

Figure 35:
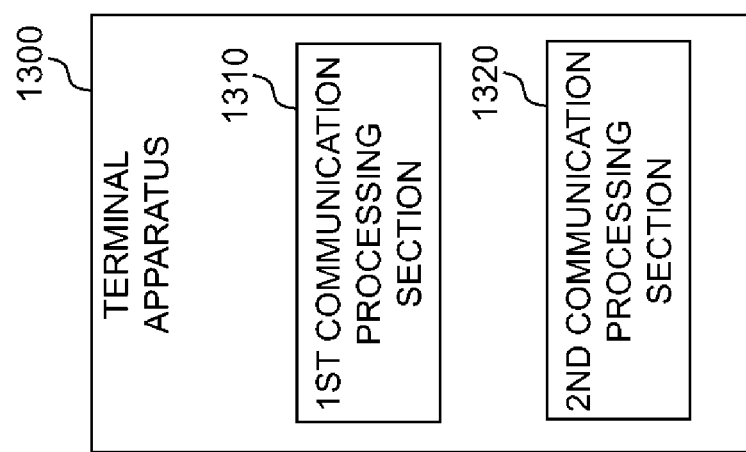
FIG. 35 is a block diagram illustrating an example of a schematic configuration of a terminal apparatus according to the fourth example embodiment.

FIG. 35 is a block diagram illustrating an example of a schematic configuration of a terminal apparatus 1300 according to the fourth example embodiment. Referring to FIG. 35, the terminal apparatus 1300 includes a first communication processing section 1310 and a second communication processing section 1320. Specific actions of the first communication processing section 1310 and the second communication processing section 1320 will be described later.

The first communication processing section 1310 and the second communication processing section 1320 may be implemented with one or more processors such as Base Band (BB) processors, another type of processors and/or the like and a memory (for example, a non-volatile memory and/or a volatile memory), hard disc and/or the like. The memory may be included in the one or more processors or may be external to the one or more processors.

The terminal apparatus 1300 may include a memory that stores programs (instructions) and one or more processors that are capable of executing the programs (instructions). The one or more processors may execute the programs to perform operations of the first communication processing section 1310 and/or the second communication processing section 1320. The programs may be programs for causing a processor to execute the operations of the first communication processing section 1310 and/or the second communication processing section 1320.

5.2. Technical Features

Next, examples of technical features of the fourth example embodiment will be described.

(1) First Communication Apparatus 1100

The first communication apparatus 1100 (the communication processing section 1110) is configured to transmit data amount information to a central unit included in a first base station, the data amount information being indicative of an amount of data transported between the first base station and a terminal apparatus, the first base station operating, for the terminal apparatus, as a secondary node of dual connectivity using at least NR.

As a first example, the first base station includes the central unit and a distributed unit and the first communication apparatus 1100 is the distributed unit. Specifically, for example, the first communication apparatus 1100 is the DU 300 of the first example embodiment and the communication processing section 1110 is the second communication processing section 343 of the DU 300 of the first example embodiment.

As a second example, the central unit may be a CU-CP (a first central unit for a control plane) included in the first base station and the first communication apparatus 1100 may be a CU-UP (a second central unit for a user plane) included in the first base station. Specifically, for example, the central unit may be the CU-CP 201 of the third example embodiment, the first communication apparatus 1100 may be the CU-UP 203 of the third example embodiment and the communication processing section 1110 may be the first communication processing section 271 of the CU-UP 203 of the third example embodiment.

As a third example, the first communication apparatus 1100 may be the first base station. Specifically, for example, the first communication apparatus 1100 may be the first base station 100 of the first example embodiment and the communication processing section 1110 may be the second communication processing section 343 of the DU 300 included in the first base station of the first example embodiment. Alternatively, the first communication apparatus 1100 may be the first base station 100 of the third example embodiment and the communication processing section 1110 may be the first communication processing section 271 of the CU-UP 203 of the third example embodiment.

This, for example, makes it possible for the SN (central unit) to report an amount of data to the MN.

(2) Second Communication Apparatus 1200

The second communication apparatus 1200 (the first communication processing section 1210) is configured to receive the data amount information from a unit included in the first base station. The second communication apparatus 1200 (the second communication processing section 1220) is configured to transmit a message for which the data amount information is used to a second base station operating as a master node of the dual connectivity.

As a first example, the unit is the distributed unit included in the first base station and the second communication apparatus 1200 is the central unit included in the first base station. Specifically, for example, the unit is the DU 300 of the first example embodiment, the second communication apparatus 1200 is the CU 200 of the first example embodiment and the first communication processing section 1210 and the second communication processing section 1220 are the first communication processing section 241 and the second communication processing section 243 of the CU 200 of the first example embodiment.

As a second example, the unit may be a CU-UP (a second central unit for a user plane) included in the first base station and the second communication apparatus 1200 may be a CU-CP (a first central unit for a control plane) included in the first base station. Specifically, for example, the unit may be the CU-UP 203 of the third example embodiment, the second communication apparatus 1200 may be the CU-CP 201 of the third example embodiment and the first communication processing section 1210 and the second communication processing section 1220 may be the first communication processing section 261 and the second communication processing section 263 of the CU-CP 201 of the third example embodiment.

As a third example, the second communication apparatus 1200 may be the first base station. Specifically, for example, the second communication apparatus 1200 may be the first base station 100 of the first example embodiment and the first communication processing section 1210 and the second communication processing section 1220 may be the first communication processing section 241 and the second communication processing section 243 of the CU 200 included in the first base station of the first example embodiment. Alternatively, the second communication apparatus 1200 may be the first base station 100 of the third example embodiment and the first communication processing section 1210 and the second communication processing section 1220 may be the first communication processing section 261 and the second communication processing section 263 of the CU-CP 201 included in the first base station 100 of the third example embodiment.

(3) Terminal Apparatus 1300

The terminal apparatus 1300 (the first communication processing section 1310) is configured to communicate with the first base station. The terminal apparatus 1300 (the second communication processing section 1320) is configured to communicate with the second base station.

For example, the terminal apparatus 1300 is the terminal apparatus 500 of the first, second or third example embodiment and the first communication processing section 1310 and the second communication processing section 1320 are the first communication processing section 541 and the second communication processing section 543 of the terminal apparatus 500.

Note that the fourth example embodiment is not limited to the above described examples.

Though example embodiments of the present disclosure have been described herein, the present disclosure is not limited to these example embodiments. It will be understood by those of ordinary skill in the art that these example embodiments are illustrative only and that various alterations can be done without departing from the scope and spirit of the present disclosure.

For example, the steps in processes described in the present specification may not necessarily be performed chronologically in the order illustrated in the sequence diagrams. For example, steps in a process may be performed in a different order than the order illustrated in a sequence diagram or may be performed in parallel. Some of steps in a process may be removed or further steps may be added to a process.

Moreover, an apparatus (one of sub-apparatuses constituting a node or a module for the node or the sub-apparatus) including constituent elements (for example, a communication processing section and/or a count section) of a node (the first base station, CU, DU, second base station or terminal apparatus) described in the present specification may be provided. In addition, methods including processes of such constituent elements may be provided, and programs for causing processors to execute processes of such constituent elements may be provided. Furthermore, computer-readable non-transitory recording media (non-transitory computer readable media) having recorded thereon such programs may be provided. It is apparent that such sub-apparatuses, modules, methods, programs and computer-readable non-transitory recording media are also included in the present disclosure.

Some or all of the above-described example embodiments can be described as in the following Supplementary Notes, but are not limited to the following.

(Supplementary Note 1)

A communication apparatus comprising:

a communication processing section configured to transmit data amount information to a central unit included in a first base station, the data amount information being indicative of an amount of data transported between the first base station and a terminal apparatus, the first base station operating, for the terminal apparatus, as a secondary node of dual connectivity using at least New Radio (NR).

(Supplementary Note 2)

The communication apparatus according to Supplementary Note 1, wherein the data includes first data transported between the first base station and the terminal apparatus through at least one radio bearer terminated at the secondary node.

(Supplementary Note 3)

The communication apparatus according to Supplementary Note 2, wherein:

the at least one radio bearer terminated at the secondary node includes SN Terminated bearers; and the first data is data transported between the first base station and the terminal apparatus through a Split bearer and an SCG bearer out of the SN Terminated bearers.

(Supplementary Note 4)

The communication apparatus according to Supplementary Note 2 or 3, wherein the data further incudes second data transported between the first base station and the terminal apparatus through at least one radio bearer terminated at a master node of the dual connectivity.

(Supplementary Note 5)

The communication apparatus according to Supplementary Note 4, wherein:

the at least one radio bearer terminated at the master node includes MN Terminated bearers; and the second data is data transported between the first base station and the terminal apparatus through a Split bearer and an SCG bearer out of the MN Terminated bearers.

(Supplementary Note 6)

The communication apparatus according to any one of Supplementary Notes 1 to 5, wherein the communication processing section is configured to transmit a signaling message including the data amount information to the central unit.

(Supplementary Note 7)

The communication apparatus according to Supplementary Note 6, wherein the communication processing section is configured to transmit the signaling message via an F1 interface to the central unit.

(Supplementary Note 8)

The communication apparatus according to Supplementary Note 6 or 7, wherein the data amount information includes a Usage count IE.

(Supplementary Note 9)

The communication apparatus according to any one of Supplementary Notes 6 to 8, wherein the signaling message is a DATA USAGE REPORT message.

(Supplementary Note 10)

The communication apparatus according to any one of Supplementary Notes 6 to 9, wherein the data amount information is information used in a message transmitted by the central unit to a second base station operating, for the terminal apparatus, as a master node of the dual connectivity.

(Supplementary Note 11)

The communication apparatus according to any one of Supplementary Notes 1 to 3, wherein the communication processing section is configured to transmit a user plane frame including the data amount information to the central unit.

(Supplementary Note 12)

The communication apparatus according to Supplementary Note 11, wherein:

the data is first data transported between the first base station and the terminal apparatus through a radio bearer terminated at the secondary node; and the data amount information is first data amount information indicative of an amount of the first data.

(Supplementary Note 13)

The communication apparatus according to Supplementary Note 12, wherein the communication processing section is configured to transmit a user plane frame including second data amount information to a second base station operating as a master node of the dual connectivity for the terminal apparatus, the second data amount information being indicative of an amount of second data transported between the first base station and the terminal apparatus through a radio bearer terminated at the master node.

(Supplementary Note 14)

The communication apparatus according to Supplementary Note 13, wherein:

the first data amount information is information that is used in a message transmitted by the central unit to the second base station; and the second data amount information is information that is not used in the message.

(Supplementary Note 15)

The communication apparatus according to any one of Supplementary Notes 11 to 14, wherein the user plane frame is a frame of GPRS Tunneling Protocol User Plane (GTP-U).

(Supplementary Note 16)

The communication apparatus according to Supplementary Note 15, wherein the user plane frame is a DL DATA DELIVERY STATUS frame.

(Supplementary Note 17)

The communication apparatus according to any one of Supplementary Notes 1 to 16, wherein the communication processing section is configured to transmit the data amount information in response to an instruction from the central unit.

(Supplementary Note 18)

The communication apparatus according to Supplementary Note 17, wherein the instruction is a Data Usage report Indication Information Element (IE).

(Supplementary Note 19)

The communication apparatus according to Supplementary Note 17 or 18, wherein:

the communication processing section is configured to transmit the data amount information in response to a signaling message including the instruction; and the signaling message is a UE CONTEXT SETUP REQUEST message or a UE CONTEXT MODIFICATION REQUEST message.

(Supplementary Note 20)

The communication apparatus according to Supplementary Note 10 or 14, wherein:

the message transmitted by the central unit to the second base station is a SECONDARY RAT DATA USAGE REPORT message.

(Supplementary Note 21)

The communication apparatus according to any one of Supplementary Notes 1 to 20, further comprising a count section configured to count the amount of the data.

(Supplementary Note 22)

The communication apparatus according to Supplementary Note 21, wherein the count section is configured to count the amount of the data at Radio Link Control (RLC) layer or Medium Access Control (MAC) layer.

(Supplementary Note 23)

The communication apparatus according to any one of Supplementary Notes 1 to 22, wherein the communication apparatus is a distributed unit included in the first base station.

(Supplementary Note 24)

The communication apparatus according to any one of Supplementary Notes 1 to 22, wherein the communication apparatus is the first base station.

(Supplementary Note 25)

The communication apparatus according to any one of Supplementary Notes 1 to 22, wherein:

the central unit is a first central unit for a control plane included in the first base station; and the communication apparatus is a second central unit for a user plane included in the first base station.

(Supplementary Note 26)

The communication apparatus according to any one of Supplementary Notes 1 to 25, wherein:

the first base station includes the central unit and a distributed unit;

the central unit is a unit that performs processing of Packet Data Convergence Protocol (PDCP) layer; and the distributed unit is a unit that performs processing of RLC layer and MAC layer.

(Supplementary Note 27)
The communication apparatus according to any one of Supplementary Notes 1 to 26, wherein the dual connectivity is dual connectivity using NR and Long Term Evolution (LTE).

(Supplementary Note 28)
The communication apparatus according to Supplementary Note 27, wherein:
the dual connectivity is E-UTRA-NR Dual Connectivity (EN-DC); and
the first base station is an en-gNB.

(Supplementary Note 29)
A communication apparatus comprising:
a first communication processing section configured to receive data amount information from a unit included in a first base station operating, for a terminal apparatus, as a secondary node of dual connectivity using at least NR, the data amount information being indicative of an amount of data transported between the first base station and the terminal apparatus; and
a second communication processing section configured to transmit a message for which the data amount information is used to a second base station operating, for the terminal apparatus, as a master node of the dual connectivity,
wherein the unit is a distributed unit included in the first base station or a second central unit for a user plane included in the first base station.

(Supplementary Note 30)
The communication apparatus according to Supplementary Note 29, wherein:
the unit is the distributed unit; and
the communication apparatus is a central unit included in the first base station.

(Supplementary Note 31)
The communication apparatus according to Supplementary Note 29, wherein:
the unit is the second central unit; and
the communication apparatus is a first central unit for a control plane included in the first base station.

(Supplementary Note 32)
The communication apparatus according to any one of Supplementary Notes 29 to 31, wherein the first communication processing section is configured to transmit, to the unit, a signaling message including an instruction to transmit the data amount information.

(Supplementary Note 33)
A terminal apparatus comprising:
a first communication processing section configured to communicate with a first base station operating, for the terminal apparatus, as a secondary node of dual connectivity using at least NR; and
a second communication processing section configured to communicate with a second base station operating, for the terminal apparatus, as a master node of the dual connectivity,
wherein the first base station includes a unit configured to transmit data amount information to a central unit included in the first base station, the data amount information being indicative of an amount of data transported between the first base station and the terminal apparatus.

(Supplementary Note 34)
A method comprising:
transmitting data amount information to a central unit included in a first base station, the data amount information being indicative of an amount of data transported between the first base station and a terminal apparatus, the first base station operating, for the terminal apparatus, as a secondary node of dual connectivity using at least NR.

(Supplementary Note 35)
A program causing a processor to execute:
transmitting data amount information to a central unit included in a first base station, the data amount information being indicative of an amount of data transported between the first base station and a terminal apparatus, the first base station operating, for the terminal apparatus, as a secondary node of dual connectivity using at least NR.

(Supplementary Note 36)
A computer-readable non-transitory recording medium having recorded thereon a program causing a processor to execute:
transmitting data amount information to a central unit included in a first base station, the data amount information being indicative of an amount of data transported between the first base station and a terminal apparatus, the first base station operating, for the terminal apparatus, as a secondary node of dual connectivity using at least NR.

(Supplementary Note 37)
A method comprising:
receiving data amount information from a unit included in a first base station operating, for a terminal apparatus, as a secondary node of dual connectivity using at least NR, the data amount information being indicative of an amount of data transported between the first base station and the terminal apparatus; and
transmitting a message for which the data amount information is used to a second base station operating, for the terminal apparatus, as a master node of the dual connectivity,
wherein the unit is a distributed unit included in the first base station or a second central unit for a user plane included in the first base station.

(Supplementary Note 38)
A program causing a processor to execute:
receiving data amount information from a unit included in a first base station operating, for a terminal apparatus, as a secondary node of dual connectivity using at least NR, the data amount information being indicative of an amount of data transported between the first base station and the terminal apparatus; and
transmitting a message for which the data amount information is used to a second base station operating, for the terminal apparatus, as a master node of the dual connectivity,
wherein the unit is a distributed unit included in the first base station or a second central unit for a user plane included in the first base station.

(Supplementary Note 39)
A computer-readable non-transitory recording medium having recorded thereon a program causing a processor to execute:
receiving data amount information from a unit included in a first base station operating, for a terminal apparatus, as a secondary node of dual connectivity using at least NR, the data amount information being indicative of an amount of data transported between the first base station and the terminal apparatus; and
transmitting a message for which the data amount information is used to a second base station operating, for the terminal apparatus, as a master node of the dual connectivity,
wherein the unit is a distributed unit included in the first base station or a second central unit for a user plane included in the first base station.

(Supplementary Note 40)
A method comprising:
communicating with a first base station operating, for a terminal apparatus, as a secondary node of dual connectivity using at least NR; and communicating with a second base station operating, for the terminal apparatus, as a master node of the dual connectivity, wherein the first base station includes a unit configured to transmit data amount information to a central unit included in the first base station, the data amount information being indicative of an amount of data transported between the first base station and the terminal apparatus.

(Supplementary Note 41)

A program causing a processor to execute:

communicating with a first base station operating, for a terminal apparatus, as a secondary node of dual connectivity using at least NR; and communicating with a second base station operating, for the terminal apparatus, as a master node of the dual connectivity, wherein the first base station includes a unit configured to transmit data amount information to a central unit included in the first base station, the data amount information being indicative of an amount of data transported between the first base station and the terminal apparatus.

(Supplementary Note 42)

A computer-readable non-transitory recording medium having recorded thereon a program causing a processor to execute:

communicating with a first base station operating, for a terminal apparatus, as a secondary node of dual connectivity using at least NR; and communicating with a second base station operating, for the terminal apparatus, as a master node of the dual connectivity, wherein the first base station includes a unit configured to transmit data amount information to a central unit included in the first base station, the data amount information being indicative of an amount of data transported between the first base station and the terminal apparatus.

This application claims priority based on Japanese Patent Application No. 2018-023331 filed on Feb. 13, 2018, the entire disclosure of which is incorporated herein.

In a mobile communication system, it will be possible to report an amount of data from a secondary node (SN) to a master node (MN) in dual connectivity.

What is claimed is:

1. A method performed by a central unit-user plane (CU-UP) of a central unit (CU) for a base station, the method comprising: hosting at least a user plane of a Packet Data Convergence Protocol (PDCP) layer of the base station; and transmitting first information to a central unit-control plane (CU-CP) of the CU for the base station via a first interface, the first information indicating a volume of data, the CU-CP connected to a distributed unit (DU) via a F1 interface and configured to host at least a control plane (CP) of the PDCP layer hosted by the CU, and the DU configured to host a Radio Link Control RLC layer, a Medium Access Control (MAC) layer and Physical (PHY) layer of the base station.

2. The method according to claim 1, wherein the volume of data is an amount of data transmitted to a terminal apparatus.

3. The method according to claim 1, wherein the base station is a gNB.

4. The method according to claim 1, wherein the first information is transmitted by the CU-CP to a master node in Dual Connectivity.

5. The method according to claim 1, wherein the volume of data is counted by the CU-UP of the CU for the base station.

6. The method according to claim 1, wherein the first information is usage count Information Elements (IE).

7. A method performed by a central unit-control plane (CU-CP) of a central unit (CU) for a base station, the CU-CP connected to a distributed unit (DU) via a F1 interface, and the DU configured to host a Radio Link Control RLC layer, a Medium Access Control (MAC) layer and Physical (PHY) layer of the base station, the method comprising:

hosting at least a control plane of a Packet Data Convergence Protocol (PDCP) layer of the base station; and receiving first information from a central unit-user plane (CU-UP) of the CU for the base station via a first interface, the first information indicating a volume of data, the CU-UP configured to host at least a user plane of the PDCP layer of the central unit.

8. The method according to claim 7, wherein the volume of data is an amount of data transmitted to a terminal apparatus.

9. The method according to claim 7, wherein the base station is a gNB.

10. The method according to claim 7, wherein the first information is transmitted by the CU-CP to a master node in Dual Connectivity.

11. The method according to claim 7, wherein the volume of data is counted by the CU-UP of the CU for the first base station.

12. A method performed by a base station including a central unit (CU), the method comprising:

transmitting, by a central unit-user plane (CU-UP) of the CU, first information to a central unit-control plane (CU-CP) of the CU via a first interface, the first information indicating a volume of data, the CU-CP configured to host at least a control plane of a Packet Data Convergence Protocol (PDCP) layer of the CU and the CU-UP configured to host at least a user plane of the PDCP layer of the CU; and receiving, by the CU-CP of the CU, the first information from the CU-UP of the CU for the base station, the CU-CP connected to a distributed unit (DU) via a F1 interface, the DU hosting RLC (Radio Link Control), MAC (Medium Access Control) and PHY (Physical) layers of the base station.

13. The method according to claim 12, wherein the volume of data is an amount of data transmitted to a terminal apparatus.

14. The method according to claim 12, wherein the base station is a gNB.

15. The method according to claim 12, wherein the first information is transmitted by the CU-CP to a master node in Dual Connectivity.

16. The method according to claim 12, wherein the volume of data is counted by the CU-UP of the CU for the first base station.

* * * * *